(12) United States Patent
Takada

(10) Patent No.: US 12,053,337 B2
(45) Date of Patent: Aug. 6, 2024

(54) ARRAY DEVICE, ARRAY METHOD, AND MANUFACTURING METHOD OF ARRAY DEVICE

(71) Applicant: KABUSHIKI KAISHA SHOFU, Kyoto (JP)

(72) Inventor: Hajime Takada, Kyoto (JP)

(73) Assignee: KABUSHIKI KAISHA SHOFU, Kyoto (JP)

( * ) Notice: Subject to any disclaimer, the term of this patent is extended or adjusted under 35 U.S.C. 154(b) by 141 days.

(21) Appl. No.: 17/481,689

(22) Filed: Sep. 22, 2021

(65) Prior Publication Data
US 2022/0096217 A1 Mar. 31, 2022

(30) Foreign Application Priority Data

Sep. 25, 2020 (JP) .................................. 2020-161193

(51) Int. Cl.
*A61C 13/103* (2006.01)
*A61C 13/01* (2006.01)
*A61C 13/36* (2006.01)

(52) U.S. Cl.
CPC .......... *A61C 13/1009* (2013.01); *A61C 13/01* (2013.01); *A61C 13/1016* (2013.01)

(58) Field of Classification Search
CPC . A61C 13/01; A61C 13/1009; A61C 13/1016; A61C 13/10; A61C 13/1013; A61C 13/12; A61C 13/34; A61C 2202/00
See application file for complete search history.

(56) References Cited

U.S. PATENT DOCUMENTS

| | | | | |
|---|---|---|---|---|
| 2,428,094 | A * | 9/1947 | Raymond | A61C 13/1013 249/129 |
| 4,299,573 | A * | 11/1981 | Ricci | A61C 13/1016 433/167 |
| 9,918,810 | B2 * | 3/2018 | Funk | A61C 13/09 |
| 2010/0136505 | A1 * | 6/2010 | Okada | A61C 13/01 433/199.1 |
| 2010/0304331 | A1 | 12/2010 | Preti et al. | |
| 2017/0265971 | A1 | 9/2017 | Funk et al. | |
| 2019/0247169 | A1 | 8/2019 | Fisker | |
| 2020/0022790 | A1 | 1/2020 | Fisker | |

FOREIGN PATENT DOCUMENTS

| | | |
|---|---|---|
| IT | 201900003367 | 9/2020 |
| JP | 2017-070518 | 4/2017 |
| JP | 2019-528997 | 10/2019 |

OTHER PUBLICATIONS

Extended European Search Report issued on Jan. 24, 2022, in European Patent Application No. 21197915.8.
Notice of Reasons for Refusal issued Dec. 12, 2023 in Japanese Patent Application No. 2020-161193, with English translation (10 pages).

* cited by examiner

*Primary Examiner* — Edward Moran
(74) *Attorney, Agent, or Firm* — Wenderoth, Lind & Ponack, L.L.P.

(57) ABSTRACT

The array device of an aspect of the present invention is an array device to be attached to a denture plate and one or more artificial teeth to thereby array the one or more artificial teeth on the denture plate, the array device comprising: a body having one or mere recesses recessed in conformity with crown shapes of the one or more artificial teeth, wherein the body includes one or more positioning portions for positioning the one or more artificial teeth on the denture plate.

8 Claims, 13 Drawing Sheets

Fig.18

| MAXILLARY | | PRODUCED-DENTURE SURFACE DEVIATION FROM DESIGN DATA | |
|---|---|---|---|
| | MEASURED PORTION | COMPARATIVE EXAMPLE 1 (mm) | EXAMPLE 1 (mm) |
| A | CENTRAL PORTION ON INCISAL EDGE OF RIGHT-SIDE CENTRAL INCISOR T1 | 0.44 | 0.06 |
| B | CENTRAL PORTION ON INCISAL EDGE OF LEFT-SIDE CENTRAL INCISOR T1 | 0.31 | 0.03 |
| C | CENTRAL PORTION ON INCISAL EDGE OF RIGHT-SIDE LATERAL INCISOR T2 | 0.45 | −0.01 |
| D | CENTRAL PORTION ON INCISAL EDGE OF LEFT-SIDE LATERAL INCISOR T2 | 0.58 | 0.07 |
| E | APEX OF RIGHT-SIDE CANINE T3 | 0.18 | 0 |
| F | APEX OF LEFT-SIDE CANINE T3 | 0.12 | −0.06 |

Fig.19

| MANDIBULAR | | PRODUCED-DENTURE SURFACE DEVIATION FROM DESIGN DATA | |
|---|---|---|---|
| | MEASURED PORTION | COMPARATIVE EXAMPLE 2 (mm) | EXAMPLE 2 (mm) |
| G | CENTRAL PORTION ON INCISAL EDGE OF RIGHT-SIDE CENTRAL INCISOR T8 | 0.24 | 0.02 |
| H | CENTRAL PORTION ON INCISAL EDGE OF LEFT-SIDE CENTRAL INCISOR T8 | 0.25 | 0.01 |
| I | CENTRAL PORTION ON INCISAL EDGE OF RIGHT-SIDE LATERAL INCISOR T9 | 0.19 | 0.02 |
| J | CENTRAL PORTION ON INCISAL EDGE OF LEFT-SIDE LATERAL INCISOR T9 | 0.22 | 0.08 |
| K | APEX OF RIGHT-SIDE CANINE T10 | −0.13 | −0.06 |
| L | APEX OF LEFT-SIDE CANINE T10 | −0.16 | −0.15 |

Fig.20

|  | PRODUCTION TIME |
|---|---|
| COMPARATIVE EXAMPLE 1 (MAXILLARY DENTURES) | 24 MINUTES |
| EXAMPLE 1 (MAXILLARY DENTURES) | 14 MINUTES |
| COMPARATIVE EXAMPLE 2 (MANDIBULAR DENTURES) | 24 MINUTES |
| EXAMPLE 2 (MANDIBULAR DENTURES) | 15 MINUTES |

ARRAY DEVICE, ARRAY METHOD, AND MANUFACTURING METHOD OF ARRAY DEVICE

CROSS-REFERENCE TO RELATED APPLICATIONS

This application claims priority to Japanese Patent application No. 2020-161193, filed Sep. 25, 2020, the disclosure of which is incorporated herein by reference in the entirety.

BACKGROUND OF THE INVENTION

1. Field of the Invention

The present invention relates to an array device, an array method, and a method of manufacturing the array device. Specifically, the present invention relates an array device arraying one or more artificial teeth, an array method, and a method of manufacturing the array device.

2. Description of the Related Art

Japanese Translation of PCT International Application No. 2019-528997 discloses a method for fabricating dentures having a denture plate and at least two artificial teeth arrayed on the denture plate. In the method described in JP2019-528997A, at least, two artificial teeth are arrayed on the denture plate using a common arrangement support to keep the at least two artificial teeth in a desired relative array.

In the method described in JP2019-528997A, however, there is still room for improvement in that the artificial teeth are positioned on the denture plate.

SUMMARY OP THE INVENTION

It is therefore an object of the present invention to provide an array device capable of arraying artificial teeth on a denture plate, an array method, and a method of manufacturing the array device.

The array device of an aspect of the present invention is an array device to be attached to a denture plate and one or more artificial teeth to thereby array the one or more artificial teeth on the denture plate, the array device comprising:
 a body having one or more recesses recessed in conformity with crown shapes of the one or more artificial teeth, wherein
 the body includes one or more positioning portions for positioning the one or more artificial teeth on the denture plate.

The array method of an aspect of the present invention is an array method for arraying one or more artificial teeth on a denture plate, the array method comprising:
 placing the denture plate;
 applying an adhesive into one or more setting holes of the denture plate in which the one or more artificial teeth are set;
 setting the one or more artificial teeth in the one or more setting holes of the denture plate;
 attaching an array device to the denture plate and the one or more artificial teeth, the array device comprising a body having one or more recesses recessed in conformity with crown shapes of the one or more artificial teeth, the body including one or more positioning portions for positioning the one or more artificial teeth on the denture plate;
 keeping the array device remaining attached to the denture plate and the one or more artificial teeth; and
 detaching the array device from the denture plate and the one or more artificial teeth.

The method of manufacturing an array device of an aspect of the present invention is a method of manufacturing an array device executed by a computer, the method comprising:
 acquiring scan data of a patient's intraoral shape;
 creating design data of a denture plate, based on the scan data;
 creating design data of one or more artificial teeth arranged on the denture plate, based on the design data of the denture plate; and
 creating design data of an array device, based on the design data of the denture plate and on the design data of the one or more artificial teeth, the array device comprising a body having one or more recesses recessed in conformity with crown shapes of the one or more artificial teeth, the body including one or more positioning portions for positioning the one or more artificial teeth on the denture plate.

According to the present invention, the artificial teeth can be positioned on the denture plate.

BRIEF DESCRIPTION OF THE DRAWINGS

FIG. 18 is a table showing an example of measurement results in Example 1 and Comparative Example 1;

FIG. 19 is a table showing an example of measurement results in Example 2 and Comparative Example 2; and FIG. 20 is a table showing an example of production times in Examples 1-2 and Comparative Examples 1-2.

DESCRIPTION OF THE PREFERRED EMBODIMENTS

Background to the Invention

Figure 1:
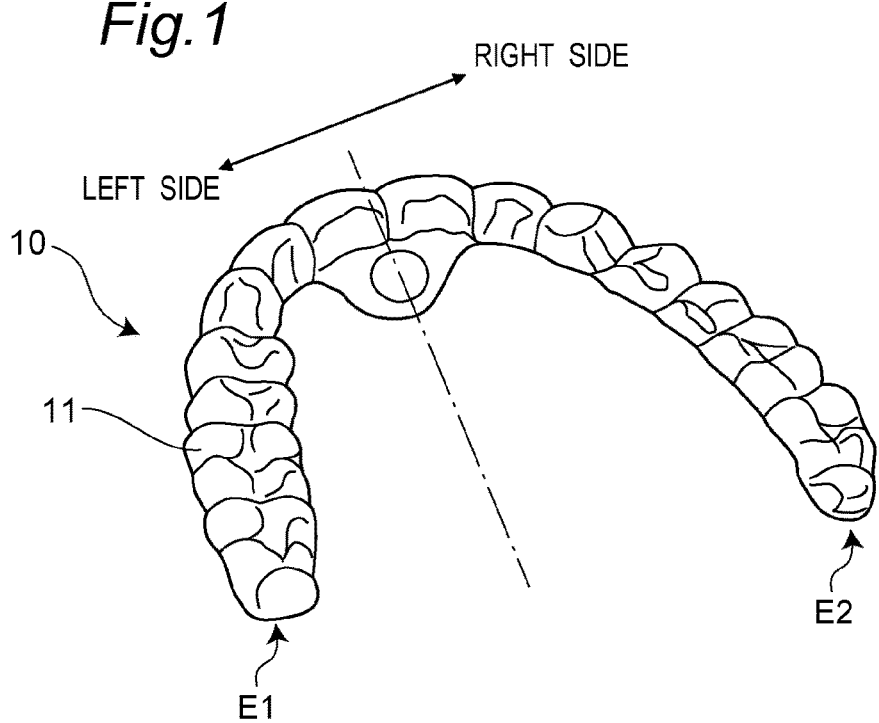
FIG. 1 is a perspective view showing an example of an array device of a first embodiment according to the present invention.

To replace lost teeth and surrounding tissue, dentures have been used. The dentures include a denture plate as a base and artificial teeth arrayed on the denture plate. In recent years, dentures may be produced with grinding or 3-D printer modeling using computer-aided design (CAD)/computer-aided manufacturing (CAM) technology. In the case of producing dentures with CAD, design data of the denture plate and of the artificial teeth is created. The design data is data when the artificial teeth are arrayed at ideal positions on the denture plate.

In the case of producing dentures with CAM, the denture plate and the artificial teeth are separately produced based on the design data created with CAD. For example, the denture plate is produced using an optical modeling device such as a 3-D printer. Previously manufactured ready-made artificial teeth are used as the artificial teeth. For this reason, a dental technician produces dentures by adhering the artificial teeth onto the denture plate. Specifically, the denture plate has setting holes for setting artificial teeth. The dental technician applies an adhesive to portions of the denture plate where the setting holes are formed, and fits the artificial teeth in the setting holes. In this manner, the dental technician arrays the artificial teeth on the denture plate by freehand to produce dentures.

When adhering the artificial teeth onto the denture plate, however, the positions of the artificial teeth adhered on the denture plate may vary due to: tolerance variations of the denture plate's setting holes and of the artificial teeth; variation in the amount of application of the adhesive; and/or the dental technician's skill level. For example, if the setting holes are formed deeper than the design data due to the tolerance, the height positions of the artificial teeth become lower than the design data. The height positions of the artificial teeth vary due to the variance in thickness of the adhesive applied to the setting holes. In this manner, the array state of artificial teeth in actually produced dentures may deviate from the array state of artificial teeth in dentures based on design data created by CAD, resulting in a problem that the artificial teeth cannot be arrayed at ideal positions on the denture plate. Offsetting of the array position of the artificial teeth with respect to the denture plate causes deterioration in the aesthetics and lowering in the masticatory function. In order to put the artificial teeth in an array state of dentures based on the design data, the dental technician adheres the artificial teeth onto the denture plate while measuring the position of each artificial tooth. This hinders improvement in the work efficiency.

Thus, as a result of diligent study, the inventors found out a configuration of an array device positioning artificial teeth on a denture plate. Specifically, the inventors found out a configuration of an array device positioning artificial teeth on a denture plate by positioning portions, and arrived at the invention below.

An array device of a first aspect of the present invention is an array device to be attached to a denture plate and one or more artificial teeth to thereby array the one or more artificial teeth on the denture plate, the array device comprising a body having one or more recesses recessed in conformity with crown shapes of the one or more artificial teeth, the body includes one or wore positioning portions for positioning the one or more artificial teeth on the denture plate.

In the array device of a second aspect of the present invention, the denture plate may include one or more positioning protrusions; the one or more positioning portions of the body may be one or more positioning recesses into which the one or more positioning protrusions are fitted; and an inner wall of the one or more positioning recesses may come into contact with an outer wall of the one or more positioning protrusions to define a position in height direction of the one or more artificial teeth arranged on the denture plate.

In the array device of a third aspect of the present invention, the one or more positioning portions may position an incisal edge of at least a central incisor of the one or more artificial teeth onto an imaginary occlusal plane.

In the array device of a fourth aspect of the present invention, a depth of the one or more recesses may be smaller than a height of the one or more artificial teeth arranged in the one or more recesses.

In the array device of a fifth aspect of the present invention, the body may include a wall disposed on an outside, opposite to an oral cavity, of the one or more artificial teeth; and, when the array device is attached to the denture plate and the one or more artificial teeth, the wall may lie between a tip, toward an opposing tooth, of the one or more artificial teeth and a maximum convexity outside the oral cavity.

In the array device of a sixth aspect of the present invention, the body may be formed into a U shape; and the plurality of positioning portions may include: a first positioning portion adjoining, inside of the body, central recesses in which central incisors of the one or more artificial teeth are set; a second positioning portion adjoining, at an end on one hand of the body, an recess toward the end on one hand in which a second molar of the one or more artificial teeth is set; and a third positioning portion adjoining, at an end on the other of the body, a recess toward the end on the other in which a second molar of the one or more artificial teeth is set.

The array device of a seventh aspect of the present invention may further comprise a pressing portion disposed on a side of the body opposite to a side on which the one or more recesses are provided.

An array method of an eighth aspect of the present invention is an array method of arraying one or more artificial teeth on a denture plate, the array method comprising: placing the denture plate; applying an adhesive into one or more setting holes of the denture plate in which the one or more artificial teeth are set; setting the one or more artificial teeth in the one or more setting holes of the denture plate; attaching an array device to the denture plate and the one or more artificial teeth, the array device comprising a body having one or more recesses recessed in conformity with crown shapes of the one or more artificial teeth, the body including one or more positioning portions for positioning the one or more artificial teeth on the denture plate; keeping the array device remaining attached to the denture plate and the one or more artificial teeth; and detaching the array device from the denture plate and the one or more artificial teeth.

In the array method of a ninth aspect of the present invention, the denture, plate may include one or more positioning protrusions; the one or more positioning portions of the body may be one or more positioning recesses into which the one or more positioning protrusions are fitted; and the attaching the array device may include bringing an inner wall of the one or more positioning recesses into contact with an outer wall of the one or more positioning protrusions to define a position in height direction of the one or more artificial teeth arranged on the denture plate.

In the array method of a tenth aspect of the present invention, the attaching the array device may include positioning, by the one or more positioning portions of the body, an incisal edge of at least a central incisor of the one or more artificial teeth onto an imaginary occlusal plane.

In the array method of an eleventh aspect of the present invention, the keeping the array device remaining attached may include pressing the array device toward the denture plate and the one or more artificial teeth.

A manufacturing method of a twelfth aspect of the present invention is a method of manufacturing an array device executed by a computer, the method comprising: acquiring scan data of a patient's intraoral shape; creating design data of a denture plate, based on the scan data; creating design data of one or more artificial teeth arranged on the denture plate, based on the design data of the denture plate; and creating design data of an array device, based on the design data of the denture plate and on the design data of the one or more artificial teeth, the array device comprising a body having one or more recesses recessed in conformity with crown shapes of the one or more artificial teeth, the body including one or more positioning portions for positioning the one or more artificial teeth on the denture plate.

In the manufacturing method of a thirteenth aspect of the present invention, the creating design data of an array device may include designing dimensions of the one or more positioning portions, based on a tip, toward an opposing tooth, of the one or more artificial teeth and on an imaginary occlusal plane.

In the manufacturing method of a fourteenth aspect of the present invention, the creating design data of an array device may include: forming the one or more positioning protrusions on the design data of the denture plate; and forming, on the body, one or more positioning recesses as the one or more positioning portions into which the one or more positioning protrusions are fitted.

In the manufacturing method of a fifteenth aspect of the present invention, the creating design data of an array device may include: detecting a maximum convexity of the one or more artificial teeth, based on the design data of the one or more artificial teeth; and forming a wall of the body on an outside, opposite to an oral cavity, of the one or mere artificial teeth and between a tip, toward an opposing tooth, of the one or more artificial teeth and the maximum convexity, based on a position of the maximum convexity.

The manufacturing method of a sixteenth aspect of the present invention may further comprise producing an array device based on the design data of the array device.

In the manufacturing method of a seventeenth aspect of the present invention, the creating design data of an array device may further include designing a pressing portion disposed on a side of the body opposite to a side on which the one or more recesses are disposed.

A computer-readable storage medium of an eighteenth aspect of the present invention stores therein a program for causing a computer to execute the method of any one of the twelfth to seventeenth aspects.

A program of a nineteenth aspect of the present invention causes a computer to execute the method of any one of the twelfth to seventeenth aspects.

Embodiments of the present invention will herein be described with reference to the accompanying drawings. The following description is given essentially as a mere exemplification and is not intended to limit this disclosure, its applications, or its uses. Furthermore, the drawings are schematic and the dimensional ratios, etc. do not necessarily conform to the actual ones.

FIRST EMBODIMENT

Array Device

Figure 2:
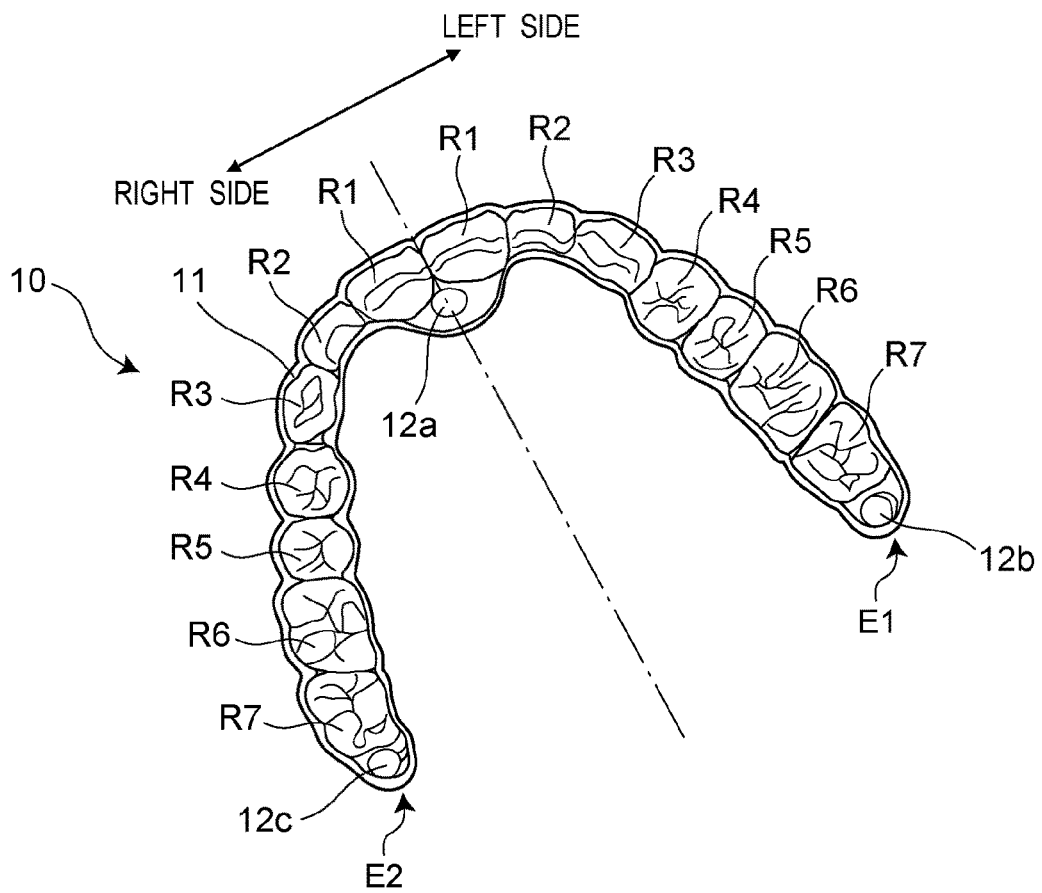
FIG. 2 is a perspective view of the array device of FIG. 1 as viewed from a different direction.

FIG. 1 is a perspective view showing an example of an array device 10 of a first embodiment according to the present invention. FIG. 2 is a perspective view of the array device 10 of FIG. 1 as viewed from a different direction. FIG. 1 shows a view of the array device 10 seen from above, while FIG. 2 shows a view of the array device 10 seen from below. The array device 10 shown in FIGS. 1 and 2 is a device for arraying artificial teeth of a maxillary dentition on a denture plate. Here, "artificial tooth" is a tooth crown material used in fabricating a plate denture and provided to a dentist or a dental technician in anatomical form of a human tooth in advance. The artificial tooth has several forms, sizes and tones and is properly selected and used in accordance with the patient's deficiency status and treatment policy. Roughly there are three types of artificial teeth, i.e., a "ceramic tooth" processed from ceramic, a "resin tooth" processed from resin, and a hard resin tooth made of combined resin material and inorganic filler.

As shown in FIGS. 1 and 2, the array device 10 comprises a body 11. The body 11 includes recesses R1 to R7 and positioning portions 12a to 12c.

The body 11 is formed into a plate having an end E1 on one hand and an end E2 on the other. Specifically, the body 11 is formed into a U shape. That is, the body 11 is formed into an arcuate dentition. The body 11 is formed of e.g. a material allowing creation by an optical modeling device such as a 3-D printer. Examples of a material forming the body 11 include photo-curing resin, polylactic acid, acrylonitrile butadiene styrene (ABS), nylon, etc.

The recesses R1 to R7 are provided on the body 11. The recesses R1 to R7 are recessed in a thickness direction of the body 11. The recesses R1 to R7 are each recessed in conformity with crown shapes of artificial teeth. Here, "crown" of an artificial tooth means a portion exposed from the denture plate when the artificial tooth is arrayed on the denture plate.

The recesses R1 to R7 are formed continuously and arrayed in a U shape on a bottom side of the body 11. The body 11 includes the recesses R1 to R7 in order from a center toward both the left and right sides. Specifically, the body 11 includes fourteen recesses R1 to R7. On the left side of the body 11, seven recesses R1 to R7 are provided from the center toward the one end E1, while on the right side of the body 11, seven recesses R1 to R7 are provided from the center toward the other end E2.

In the first embodiment, the recesses R1 to R7 are recessed in conformity with the crown shapes of the artificial teeth of the maxillary dentition. In other words, the recesses R1 to R7 are recessed in conformity with the crown shapes of an upper central incisor, an upper lateral incisor, an upper canine, an upper first premolar, an upper second premolar, an upper first molar, and an upper second molar, respectively, of the artificial teeth. For this reason, when the array device 10 is attached to the artificial teeth, the recesses R1 to R7 fit the crown portions of the upper central incisor, the upper lateral incisor, the upper canine, the upper first premolar, the upper second premolar, the upper first molar, and the upper second molar.

The positioning portions 12a to 12c position artificial teeth on the denture plate. The positioning portions 12a to 12c define the position in a height direction and a horizontal direction of the artificial teeth arranged on the denture plate.

In the first embodiment, the body 11 includes a first positioning portion 12a, a second positioning portion 12b, and a third positioning portion 12c. The first positioning portion 12a adjoins, inside of the body 11, the central recesses R1 in which central incisors of the artificial teeth are set. The second positioning portion 12b adjoins, at the one end E1 of the body 11, the recess R7 toward the one end E1 in which a second molar of the artificial teeth is set. The third positioning portion 12c adjoins, at the other end E2 of the body 11, the recess R7 toward the other end E2 in which a second molar of the artificial teeth is set. The second positioning portion 12b and the third positioning portion 12c are disposed in an array direction of the recesses R1 to R7.

The first positioning portion 12a defines a position in the height direction of artificial teeth for front teeth of the artificial teeth. The artificial teeth for front teeth are the central incisors, lateral incisors, and canines. The first positioning portion 12a positions incisal edges of the central incisors, incisal edges of the lateral incisors, and apexes of the canines on an imaginary occlusal plane. "Incisal edge" means a pointed portion of a crown portion in contact with an opposing tooth in each of the central incisor and the lateral incisor. "Apex" means a pointed portion of the crown portion in contact with the opposing tooth in the canine. "Imaginary occlusal plane" refers to a plane determined using a Campel plane formed by a lower edge of either a left or right ala of nose and by upper edges of both tragi and becomes a reference when setting an occlusal plane.

The second positioning portion 12b and the third positioning portion 12c define the position in the height direction of artificial teeth for molars of the artificial teeth. The artificial teeth for molars include a first premolar, a second premolar, a first, molar, and the second molar. The second positioning portion 12b and the third positioning portion 12c define each of cusp apexes of the first premolar, the second premolar, the first molar, and the second molar at a position apart a predetermined distance from the Imaginary occlusal plane. "Cusp apex" means a pointed portion of a crown portion in contact with the opposing tooth in each of the first premolar, the second premolar, the first molar, and the second molar.

In the first embodiment, the positioning portions 12a to 12c are positioning recesses 12a to 12c disposed on the body 11. The positioning recesses 12a to 12c are cylindrically concaved holes. By adjusting dimensions of the positioning recesses 12a to 12c, it is possible to define the position in the height direction of the artificial teeth. For example, by adjusting depths of the positioning recesses 12a to 12c, it is possible to define the position in the height direction of the artificial teeth.

Figure 3:
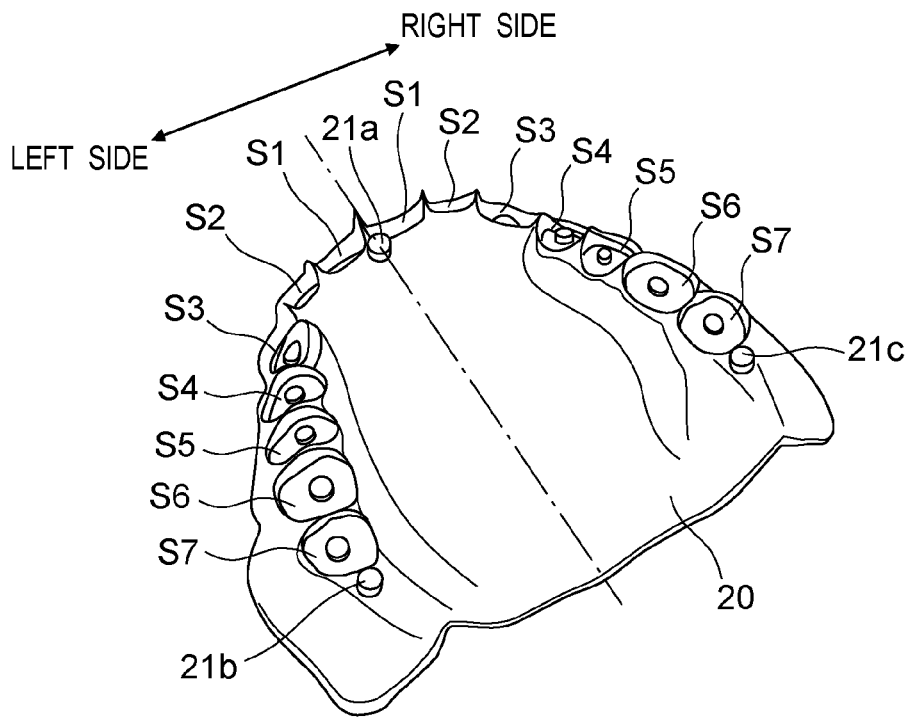
FIG. 3 is a perspective view showing an example of a denture plate.

FIG. 3 is a perspective view showing an example of a denture plate 20. As shown in FIG. 3, the denture plate 20 is a base on which artificial teeth are set. The denture plate 20 is created into a shape in conformity with an intraoral shape. For example, the denture plate 20 is of a fan shape. In the first embodiment, the denture plate 20 has a shape in conformity with a maxillary intraoral shape.

The denture plate 20 includes setting holes S1 to S7 in which artificial teeth are set. In the denture plate 20, the setting holes S1 to S7 are formed in a U shape. That is, the denture plate 20 is disposed in a dentition arch shape.

The denture plate 20 includes the setting holes S1 to S7 in order from the center toward both the left and right sides. Specifically, the denture plate 20 includes fourteen setting holes S1 to S7. In the denture plate 20, seven setting holes S1 to S7 are provided from the center toward the left side, and seven setting holes S1 to S7 are provided from the center toward the right side.

In the first embodiment, the setting holes S1 to S7 are recessed in conformity with shapes of bases of artificial teeth of the maxillary dentition. In other words, the setting holes S1 to S7 are recessed in conformity with the shapes of the bases of the artificial teeth, i.e., the upper central incisor, the upper lateral incisor, the upper canine, the upper first premolar, the upper second premolar, the upper first molar, and the upper second molar, respectively. Here, "base" means a portion of an artificial tooth set in each of the setting holes S1 to S7 of the denture plate 20 and means a portion embedded in the denture plate 20. Thus, when the array device 10 is attached to artificial teeth, the setting holes S1 to S7 fit the crown portions of the upper central incisor, the upper lateral incisor, the upper canine, the upper first premolar, the upper second premolar, the upper first molar, and the upper second molar.

The denture plate 20 includes positioning protrusions 21a to 21c. The positioning protrusions 21a to 21c protrude in the thickness direction of the denture plate 20. For example, the positioning protrusions 21a to 21c have a cylindrical shape. The positioning protrusions 21a to 21c are fitted into the positioning recesses 12a to 12c, respectively, of the array device 10.

In the first embodiment, the denture plate 20 includes the first positioning protrusion 21a, the second positioning protrusion 21b, and the third positioning protrusion 21c. The first positioning protrusion 21a, the second positioning protrusion 21b, and the third positioning protrusion 21c are fitted into the first positioning recess 12a, the second positioning recess 12b, and the third positioning recess 12c, respectively. The first positioning protrusion 21a adjoins, inside of the denture plate 20, the central setting holes S1 in which central incisors of the artificial teeth are set. The second positioning protrusion 21b adjoins, at the left side of the denture plate 20, the setting hole S7 in which a second molar of the artificial teeth is set. The third positioning protrusion 21c adjoins, at the right side of the denture plate 20, the setting hole S7 in which a second molar of the artificial teeth is set. The second positioning protrusion 21b and the third positioning protrusion 21c are disposed in the array direction of the setting holes S1 to S7. Here, "array direction" means a direction in which the setting holes S1 to S7 are set.

Figure 4:
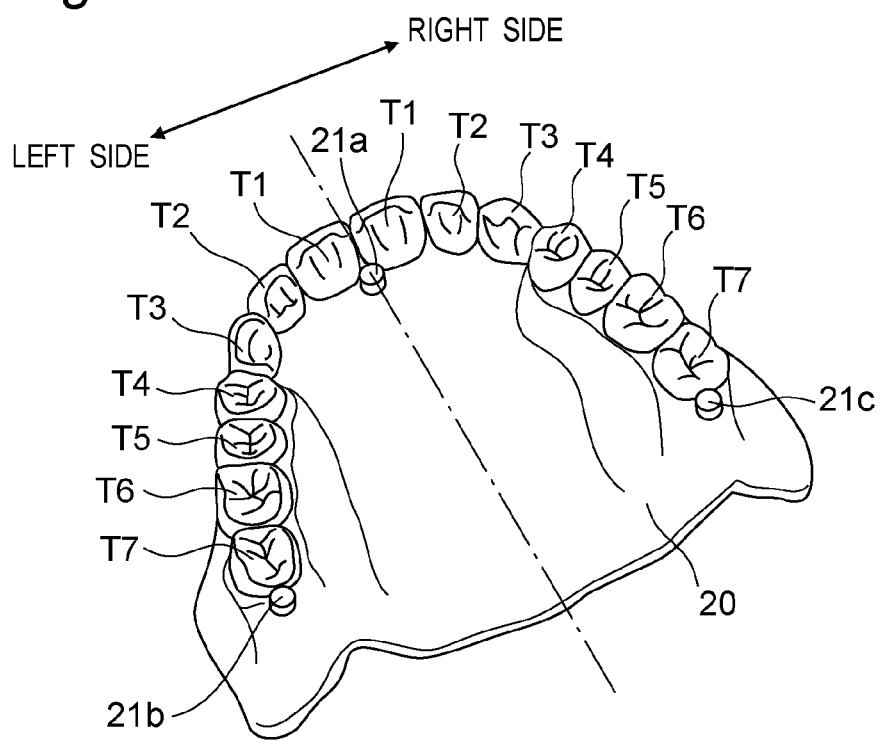
FIG. 4 is a perspective view showing an example of the state where artificial teeth are arranged on the denture plate.

FIG. 4 is a perspective view showing an example of the state where the artificial teeth T1 to T7 are arranged on the denture plate 20. FIG. 4 shows the state where the artificial teeth T1 to T7 are set after an adhesive is applied to the setting holes S1 to S7. As shown in FIG. 4, the artificial teeth T1 to T7 are set in the setting holes S1 to S7 of the denture plate 20. Specifically, in the setting holes S1 to S7 of the denture plate 20 there are set the bases of the upper central incisor T1, the upper lateral incisor T2, the upper canine T3, the upper first premolar T4, the upper second premolar T5, the upper first molar T6, and the upper second molar T7, respectively.

Figure 5:
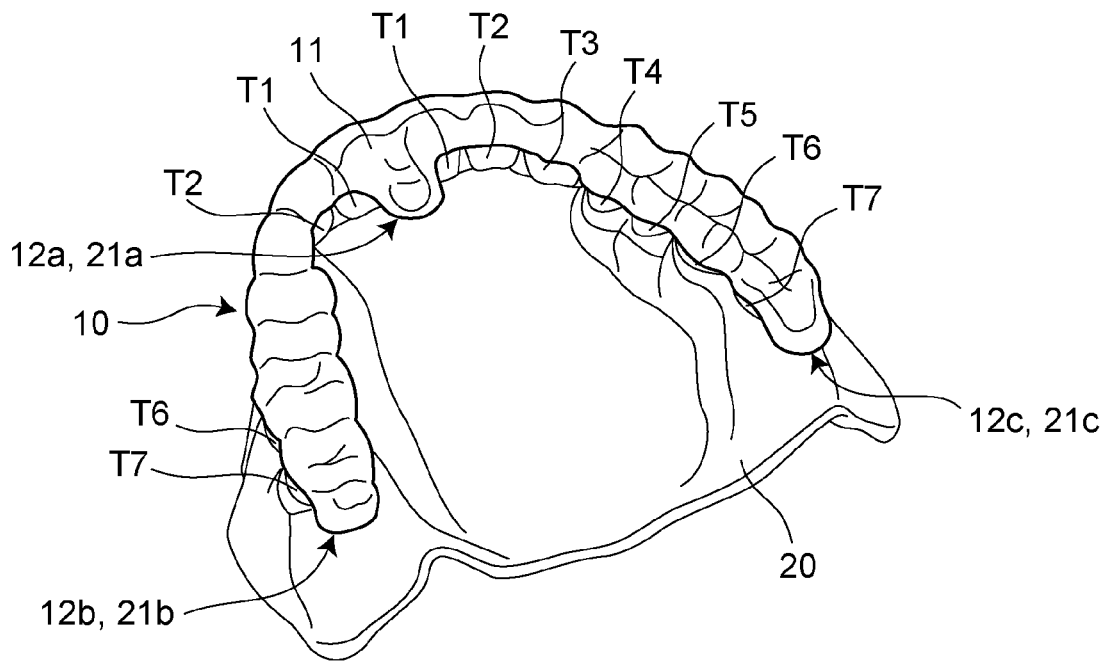
FIG. 5 is a perspective view showing an example of the state where the array device is attached to the denture plate and the artificial teeth.
Figure 6:
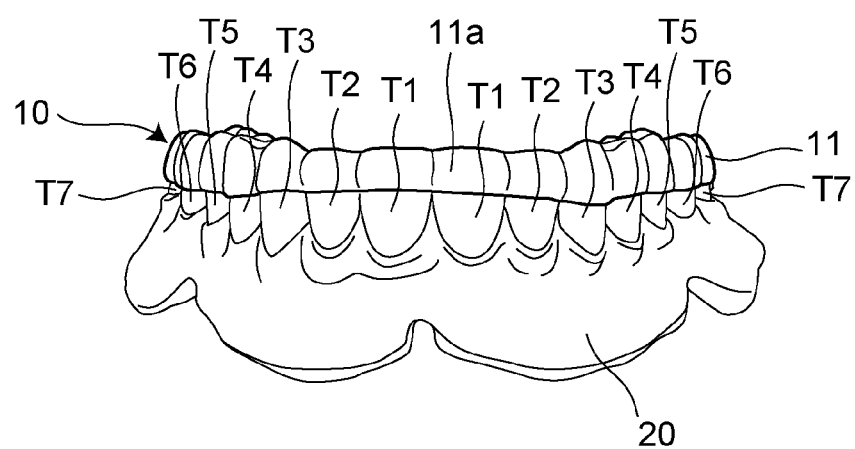
FIG. 6 is a schematic view, seen from the front, of the denture plate and the artificial teeth to which the array device of FIG. 5 is attached.

FIG. 5 is a perspective view showing an example of the state where the array device 10 is attached to the denture plate 20 and the artificial teeth T1 to T7. FIG. 6 is a schematic view, seen from the front, of the denture plate 20 and the artificial teeth T1 to T7 to which the array device 10 of FIG. 5 is attached. As shown in FIGS. 5 and 6, the array device 10 is attached to the denture plate 20 and the artificial teeth T1 to T7 such that the positioning protrusions 21a to 21c of the denture plate 20 are fitted into the positioning recesses 12a to 12c. For this reason, inner walls of the positioning recesses 12a to 12c come into contact with outer walls of the positioning protrusions 21a to 21c. This defines the position in the height direction of the artificial teeth T1 to T7 arranged on the denture plate 20.

The array device 10 is attached to the denture plate 20 and the artificial teeth T1 to T7 in such a manner as to cover the crown portions of the artificial teeth T1 to T7. The array device 10 does not cover the whole of the artificial teeth T1 to T7 but covers upper portions of crown of the artificial teeth T1 to T7. This allows the bases, not upper portions of crown, of the artificial teeth T1 to T7 to be exposed from the array device 10. Here, "upper portion of crown" means a range up to a maximum convexity from an incisal edge, an apex, or a cusp apex that is a tip, toward the opposing tooth, of an artificial tooth. "Maximum convexity" means a portion at which the horizontal bulge of an artificial tooth is maximized.

The body 11 of the array device 10 includes a wall 11a disposed on the outside, opposite to the oral cavity, of the artificial teeth T1 to T7. The wall 11a covers a part of the artificial teeth T1 to T7. The wall 11a is disposed continuously on the outside, opposite to the oral cavity, of the artificial teeth T1 to T7.

Figure 7:
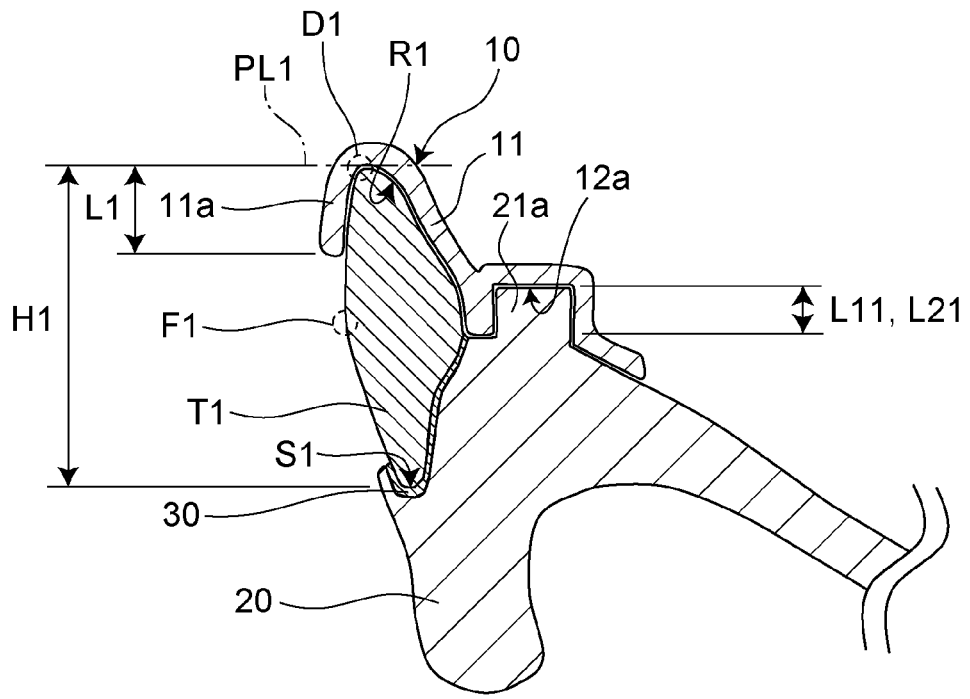
FIG. 7 is a schematic sectional view of a portion including an upper central incisor of FIG. 5.

FIG. 7 is a schematic sectional view of a portion including the upper central incisor T1 of FIG. 5. As shown in FIG. 7, the upper central incisor T1 is set in the setting hole S1 of the denture plate 20. Specifically, the base of the upper central incisor T1 is set in the setting hole S1. An adhesive 30 is applied to the setting hole S1. For this reason, the upper central incisor T1 is set raised from the bottom of the setting hole S1 by the thickness of the adhesive 30.

The upper portion of crown of the upper central incisor T1 is set in the recess R1 of the array device 10. Since the recess R1 is recessed in conformity with the shape of the upper portion of crown of the upper central incisor T1, the inner wall of the recess R1 fits the upper portion of crown of the upper central incisor T1. In this manner, when the array device 10 is attached to the upper central incisor T1, the crown portion of the upper central incisor T1 is covered by the array device 10.

A depth L1 of the recess R1 of the array device 10 is smaller than a height H1 of the upper central incisor T1 set in the recess R1. This allows a part of the upper central incisor T1 to be exposed from the array device 10.

On the outside, opposite to the oral cavity, of the upper central incisor T1, the wall 11a forming a part of the recess R1 of the array device 10 covers the upper portion of crown of the upper central incisor T1. The wall 11a restrains the upper central incisor T1 from failing toward the outside of the oral cavity. The wall 11a covers the upper portion of crown of the upper central incisor T1 outside the oral cavity, but does not cover a lower portion of crown closer to a base surface than the upper portion of crown is.

The wall 11a is disposed between an incisal edge D1 of the upper central incisor T1 and a maximum convexity F1 outside the oral cavity. Specifically, the wall 11a extends downward from the incisal edge D1 of the upper central incisor T1 and is not disposed below the maximum convexity F1. In FIG. 7, the wall 11a is positioned above the maximum convexity F1.

In this manner, the array device 10 allows a part of the upper central incisor T1 to be exposed without covering the whole thereof, whereby it is possible to form an escape route for the adhesive 30 to flow out from the setting hole S1. Thus, in the case of positioning the upper central incisor T1 on the denture plate 20 by the array device 1, the excess adhesive 30 can be extruded from the setting hole S1 to the outside of the setting hole S1. It is also possible to form an escape for the adhesive by providing a block-out on the lingual side of the artificial tooth.

The first positioning recess 12a of the array device 10 and the first positioning protrusion 21a of the denture plate 20 are disposed adjoining the upper central incisors T1. The first positioning protrusion 21a of the denture plate 20 is fitted into the first positioning recess 12a of the array device 10. Accordingly, due to contact of the inner wall of the first positioning recess 12a with the outer wall of the first positioning protrusion 21a, the position in the height direction is defined of the upper central incisor T1 set in the setting hole S1 of the denture plate 20.

The first positioning recess 12a positions the incisal edge D1 of the upper central incisor T1 on an imaginary occlusal plane PL1. Specifically, attachment of the array device 10 is performed with the upper central incisor T1 being set in the setting hole S1 to which the adhesive 30 is applied. The array device 10 is attached to the denture plate 20 and the upper central incisor T1 such that the first positioning protrusion 21a is fitted into the first positioning recess 12a. At this time, the array device 10 is pressed against the denture plate 20 and the upper central incisor T1 until the inner wall of the first positioning recess 12a comes into contact with the outer wall of the first positioning protrusion 21a. As a result, the upper central incisor T1 is pressed down toward the bottom surface of the setting hole S1, while the excess adhesive 30 is extruded from the setting hole S1 to the exterior. Then, the inner wall of the first positioning recess 12a comes into contact with the outer wall of the first positioning protrusion 21a so that the upper central incisor T1 is positioned on the denture plate 20. In consequence, the incisal edge D1 of the upper central incisor T1 is positioned on the imaginary occlusal plane PL1. By such positioning, the aesthetics can be improved. It is also possible to form an escape for the adhesive by the provision of the block-out on the lingual side of the artificial tooth.

The position of contact of the inner wall of the first positioning recess 12a with the outer wall of the first positioning protrusion 21a can be adjusted by the dimensions of the first positioning recess 12a. Specifically, the dimensions of the first positioning recess 12a are determined based on the incisal edge D1 of the upper central incisor T1 and on the imaginary occlusal plane PL1. In the first embodiment, a depth L11 of the first positioning recess 12a is substantially equal to a height L21 of the first positioning protrusion 21a. Here, "substantially" means that the error is within 5%. Thus, by the contact of the concave surface of the first positioning recess 12a with the convex surface of the first positioning protrusion 21a, it is possible to define the position in the height direction of the upper central incisor T1 set in the setting hole S1 of the denture plate 20.

Description of the upper central incisor T1 shown in FIG. 7 applies also to other artificial teeth for front teeth. The relationship between the depth L1 of the recess R1 and the height H1 of the upper central incisor T1 and description of the wall 11a apply also to the artificial teeth for molars.

Figure 8:
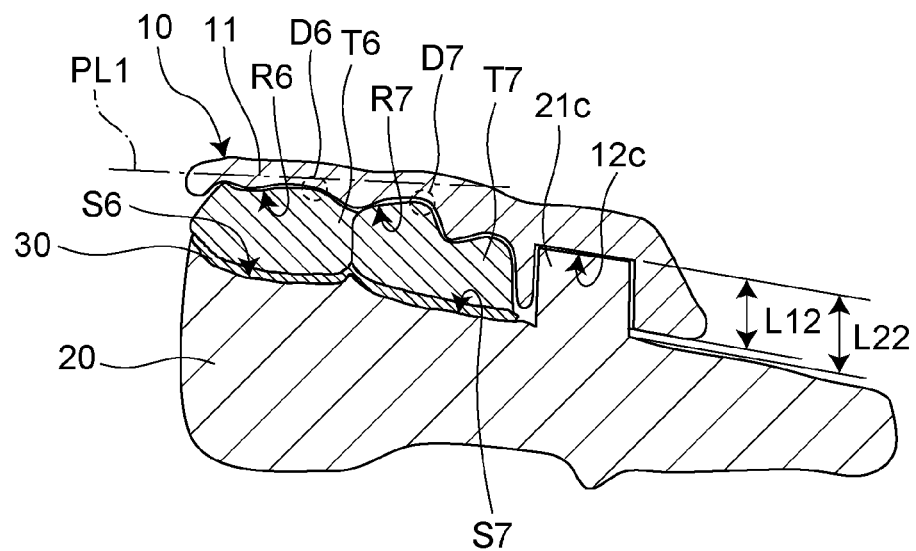
FIG. 8 is a schematic sectional view of a portion including an upper first molar and an upper second molar of FIG. 5.

FIG. 8 is a schematic sectional view of a portion including the upper first molar T6 and the upper second molar T7 of FIG. 5. As shown in FIG. 8, the upper first molar T6 and the upper second molar T7 are set in the setting holes S6 and S7, respectively, of the denture plate 20. The adhesive 30 is applied to the setting holes S6 and S7. For this reason, the upper first molar T6 and the upper second molar T7 are set raised from the bottoms of the setting holes S6 and S7 by the thickness of the adhesive 30.

The crown portion of the upper first molar T6 is set in the recess R6 of the array device 10. Since the recess R6 is recessed in conformity with the shape of the crown portion of the upper first molar T6, the inner wall of the recess R6 fits the crown portion of the upper first molar T6. The crown portion of the upper second molar T7 is set in the recess R7 of the array device 10. Since the recess R7 is recessed in conformity with the shape of the crown portion of the upper second molar T7, the inner wall of the recess R7 fits the crown portion of the upper first molar T7. In this manner, the crown portions of the upper first molar T6 and of the upper second molar T7 are covered by the array device 10.

The third positioning recess 12c of the array device 10 and the third positioning protrusion 21c of the denture plate 20 are disposed adjoining the upper second molar T7. The third positioning protrusion 21c of the denture plate 20 is fitted into the third positioning recess 12c of the array device 10. Accordingly, due to contact of the inner wall of the third positioning recess 12c with the outer wall of the third positioning protrusion 21c, the position in the height direction is defined of the upper first molar T6 and the upper second molar T7 set in the setting holes S6 and S7, respectively, of the denture plate 20.

The third positioning recess 12c positions the cusp apexes D6 and D7 of the upper first molar T6 and the upper second molar T7 at a position apart a determined distance from the imaginary occlusal plane PL1. Specifically, attachment of the array device 10 is performed with the upper first molar T6 and the upper second molar T7 being set in the setting holes S6 and S7 to which the adhesive 30 is applied. The array device 10 is attached to the denture plate 20 and the upper first molar T6 and the upper second molar T7 such that the third positioning protrusion 21c is fitted into the third positioning recess 12c. At this time, the array device 10 is pressed against the denture plate 20 and the upper first molar T6 and the upper second molar T7 until the inner wall of the third positioning recess 12c comes into contact with the outer wall of the third positioning protrusion 21c. As a result, the upper first molar T6 and the upper second molar T7 are pressed down toward the bottom surfaces of the setting holes S6 and S7, while the excess adhesive 30 is extruded to the exterior of the setting holes S6 and S7. Then, the inner wall of the third positioning recess 12c comes into contact with the outer wall of the third positioning protrusion 21c so that the upper first molar T6 and the upper second molar T7 are positioned on the denture plate 20. In consequence, the cusp apexes D6 and D7 of the upper first molar T6 and the upper second molar T7 are positioned at a predetermined distance from the imaginary occlusal plane PL1. Such positioning enables the masticatory function to be improved.

The position of contact of the inner wall of the third positioning recess 12c with the outer wall of the third positioning protrusion 21c can be adjusted by the dimensions of the third positioning recess 12c. Specifically, the dimensions of the third positioning recess 12c are determined based on the cusp apexes D6 and D7 of the upper first molar T6 and the upper second molar T7 and on the imaginary occlusal plane PL1. In the first embodiment, a depth L12 of the third positioning recess 12c is designed to be smaller than a height L22 of the third positioning protrusion 21c. Thus, by the contact of the concave surface of the third positioning recess 12c with the convex surface of the third positioning protrusion 21c, it is possible to define the position in the height direction of the upper first molar T6 and the upper second molar T7 set in the setting holes S6 and S7 of the denture plate 20. As a result, the cusp apexes D6 and D7 of the upper first molar T6 and the upper second molar T7 can be positioned at a position apart a predetermined distance from the imaginary occlusal plane PL1.

Description of the upper first molar T6 and the upper second molar T7 shown in FIG. 8 applies also to other artificial teeth for premolars and molars. Description of the third positioning recess 12c and the third positioning protrusion 21c shown in FIG. 8 applies also to the second positioning recess 12b and the second positioning protrusion 21b.

Manufacturing System

Figure 9:
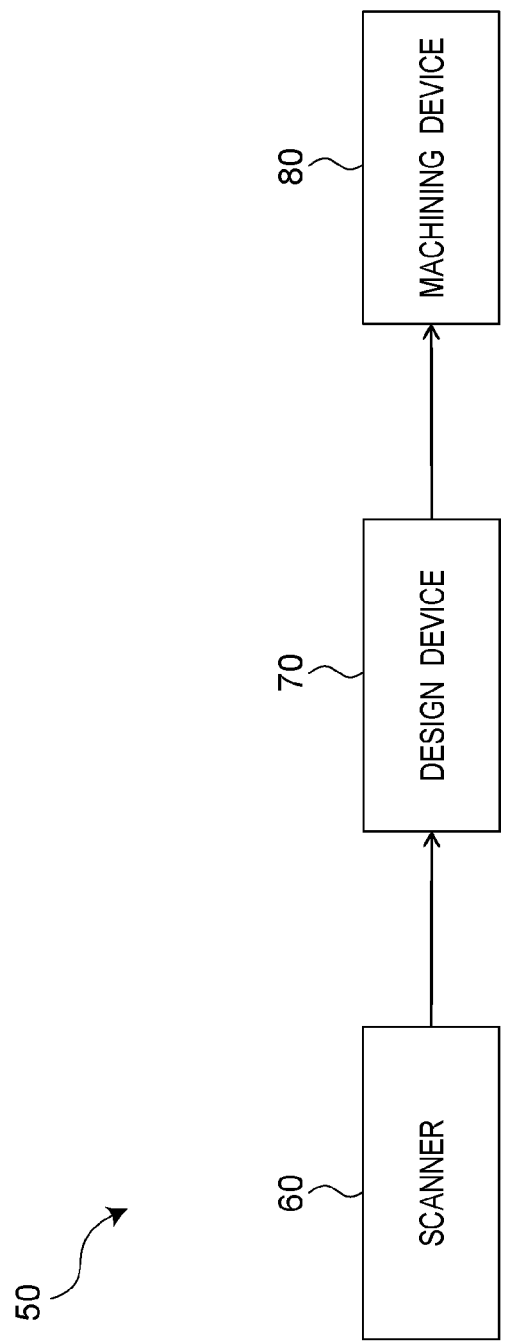
FIG. 9 is a block diagram showing an example of a manufacturing system of the first embodiment according to the present invention.

FIG. 9 is a block diagram showing an example of a manufacturing system 50 of the first embodiment according to the present invention. As shown in FIG. 9, the manufacturing system 50 is a system for manufacturing the array device 10 and comprises a scanner 60, a design device 70, and a machining device 80. In the first embodiment, the example will be described of manufacturing the array device 10 for arraying the artificial teeth T1 to T7 of the maxillary dentition on the denture plate 20.

Scanner

The scanner 60 scans the shape of maxillary and mandibular dentitions of a patient. For example, the scanner 60 directly scans the interior of the oral cavity of the patient so as to acquire shape data i.e. scan data of the patient's maxillary and mandibular dentitions.

Alternatively, the scanner 60 scans a working model reproducing the patient's intraoral shape to thereby acquire shape data i.e. scan data of the patient's maxillary and mandibular dentitions. Specifically, the working model is created by taking an impression of the patient's oral cavity with an impression material and pouring plaster into the impression. An occlusal plate is then fabricated for bite taking. The working model is scanned while mounting the working model on an articulator.

The scanner 60 is a dental 3-D scanner for example. The dental 3-D scanner can be e.g. an optical scanner. The scan data is three-dimensional shape data of the maxillary and mandibular dentitions.

The shape data i.e. the scan data of the maxillary dentition scanned by the scanner 60 is sent to the design device 70.

Design Device

The design device 70 acquires the scan data of the maxillary and mandibular dentitions from the scanner 60. The design device 70 creates design data of maxillary dentition dentures, based on the scan data acquired. Specifically, the design device 70 creates design data of the denture plate 20, based on the scan data. Next, the design device 70 creates design data of artificial teeth T1 to T7 to be arranged on the denture plate 20, based on the design data of the denture plate 20.

The design device 70 creates design data of the array device 10, based on the design data of the denture plate 20 and on the design data of the dentures including the artificial teeth T1 to T7.

The design device 70 is e.g. a computer storing CAD software.

The design data of the array device 10 created by the design device 70 is sent to the machining device 80. For example, the design data is STL data.

Machining Device

The machining device 90 produces the array device 10, based on the design data created by the design device 70. The machining device 80 may be a 3-D printer or a grinding device.

Figure 10:
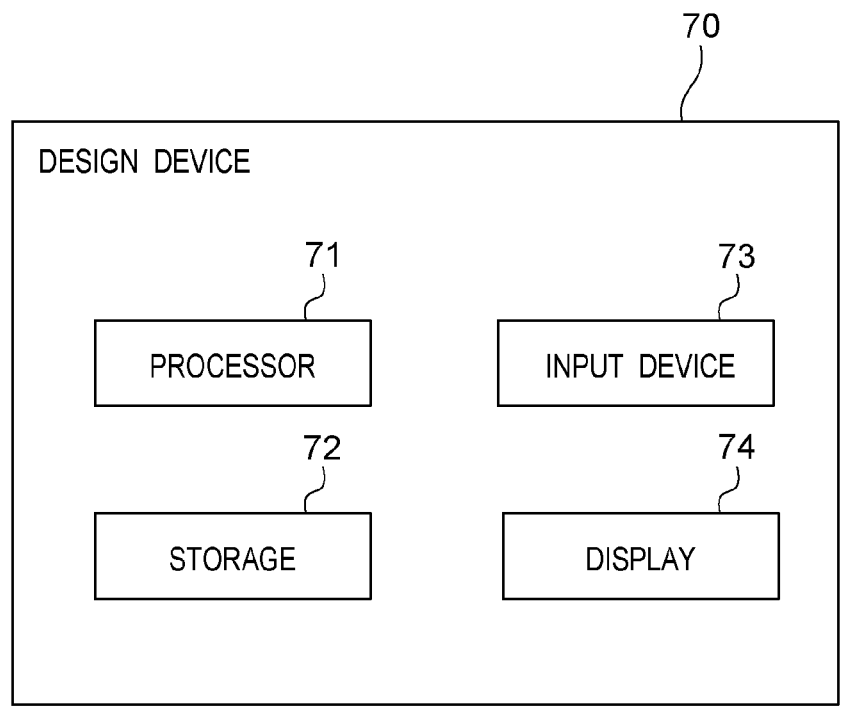
FIG. 10 is a block diagram showing an example of a design device.

The design device 70 will be described in detail. FIG. 10 is a block diagram showing an example of the design device 70 of the first embodiment according to the present invention. As shown in FIG. 10, the design device 70 comprises a processor 71, a storage 72, an input device 73, and a display 74. The design device 70 is a computer for example.

Processor

The processor 71 is for example a central processing unit (CPU), a microprocessor, or other processing units capable of executing computer-executable instructions. The processor 71 can execute instructions stored in the storage unit 72.

Storage

The storage 72 is e.g. a computer storage medium that stores instructions executed by the processor. The storage 72 may be e.g. a RAM, a ROM, an EEPROM, a flash memory, or other memory techniques, a CD-ROM, a DVD, or other optical disc storages, a magnetic cassette, a magnetic tape, a magnetic disc storage, or other magnetic storage devices.

The storage 72 stores a dental CAD program.

Input Device

The input device 73 is a device that accepts a user's input. The input device 73 may include e.g. a keyboard, a mouse, and a voice input device. By operating the input device 73, the user can design the denture plate 20, the artificial teeth T1 to T7, and the array device 10.

Display

The display 74 is a device that displays information. The display 74 is a display device for example. On the display 74, for example, there appear design screens for designing the denture plate 20, the artificial teeth T1 to T7, and the array device 10.

Elements making up the design device 70 can be implemented by a computing device implementable by semiconductor elements, etc. Functions of these constituent elements may be configured by hardware only or may be implemented by combining hardware and software.

The elements making up the design device 70 are not limited thereto. The design device 70 may include elements other than these elements. For example, the design device 70 may include a communicator that communicates with another device. The communicator includes a circuit that communicates with an external device in compliance with a predetermined communication standard (e.g. LAN, Wi-Fi (registered trademark), Bluetooth (registered trademark), USB, HDMI (registered trademark), controller area network (CAN), or serial peripheral interface (SPI)).

Manufacturing Method

Figure 11:
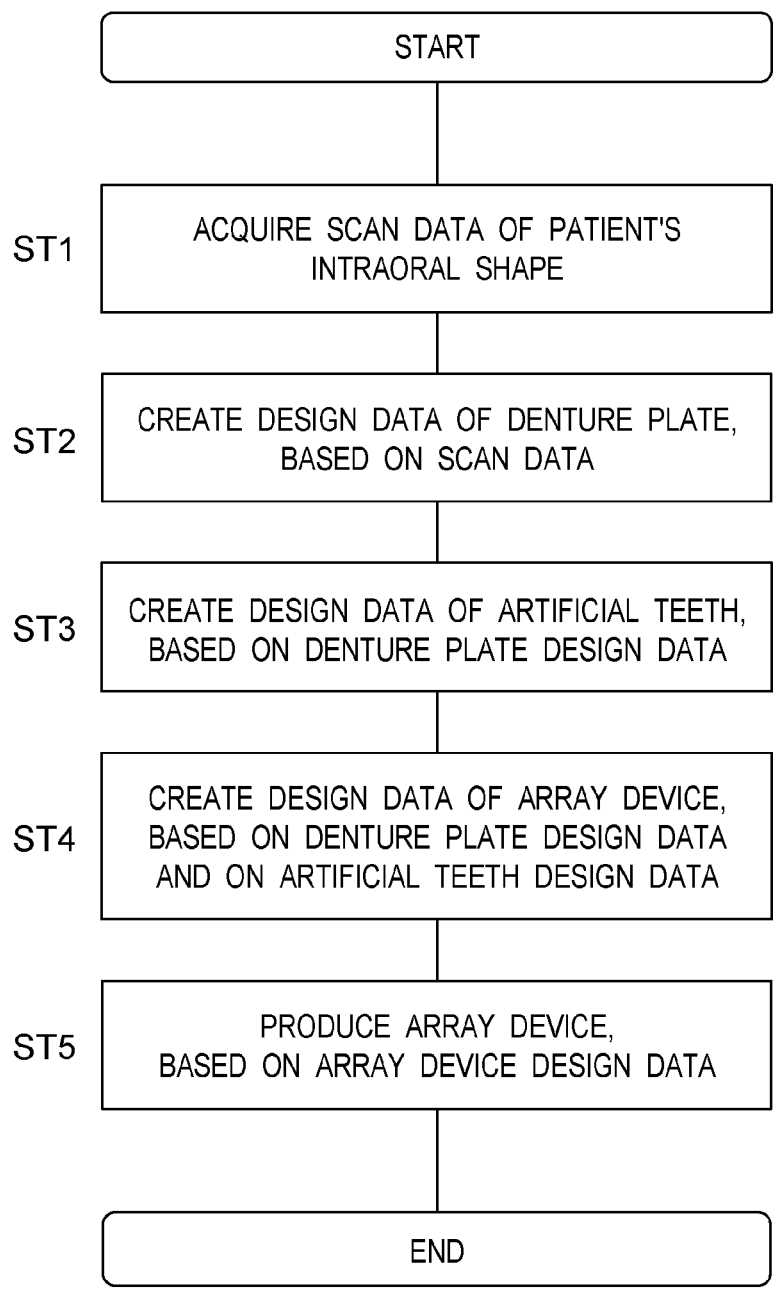
FIG. 11 is a flowchart showing an example of a method of manufacturing the array device of the first embodiment according to the present invention.

A method of manufacturing the array device 10 will be described. FIG. 11 is a flowchart showing an example of the manufacturing method of the first embodiment according to the present invention. The method shown in FIG. 11 is carried out by the manufacturing system 50.

As shown in FIG. 11, at step ST1, scan data of a patient's intraoral shape is acquired. The scan data is e.g. scan data obtained by scanning a working model reproducing the patient's intraoral shape. The scan data obtained by the scanner 60 is sent to the design device 70. At step ST1, the design device 70 acquires the scan data from the scanner 60.

At step ST2, design data of the denture plate 20 is created based on the scan data. At step ST2, the design device 70 creates design data of the denture plate 20 having the setting holes S1 to S7 in which the artificial teeth T1 to T7 are set.

At step ST3, design data of the artificial teeth T1 to T7 arranged on the denture plate 20 is created based on the design data of the denture plate 20. At step ST3, the design device 70 arranges the design data of the artificial teeth T1 to T7 on the design data of the denture plate 20. The design data of the artificial teeth T1 to T7 is e.g. previously created ready-made design data.

On CAD, the design device 70 displays the design data of the denture plate 20 and the ready-made design data of the artificial teeth T1 to T7 and then arranges the artificial teeth T1 to T7 in the setting holes S1 to S7 of the denture plate 20, thereby creating design data of the dentures. The design device 70 may modify, on CAD, the ready-made design data of the artificial teeth T1 to T7. For example, to make ideal the occlusion between the maxillary and mandibular dentitions, the ready-made design data of the artificial teeth T1 to T7 may be modified depending on the patient.

At seep ST4, design data of the array device 10 is created based on the design data of the denture plate 20 and on the design data of the artificial teeth T1 to T7. At step ST4, the design device 70 creates the design data of the array device 10, based on the design data of the dentures. Specifically, the design device 70 creates the design data of the array device 10 having a shape along the array direction of the artificial teeth T1 to T7. The design device 70 forms, on the array device 10, the recesses R1 to R7 recessed in conformity with the artificial teeth T1 to T7.

At step ST4, the design device 70 creates positioning portions on the body 11 of the array device 10. Specifically, the design device 70 first creates the positioning protrusions 21a to 21c on the design data of the denture plate 20. In the first embodiment, the first positioning protrusion 21a is formed at a position adjacent to the central setting holes S1 of the denture plate 20. The second positioning protrusion 21b is formed at a position adjacent to the setting hole S7 on the left side of the denture plate 20. The third positioning protrusion 21c is formed at a position adjacent to the setting hole S7 on the right side of the denture plate 20. The design device 70 then forms, on the body 11, the positioning recesses 12a to 12c as the positioning portions into which the positioning protrusions 21a to 21c are fitted. The design device 70 designs the dimensions L11 of the positioning recesses 12a to 12c, based on the tips D1, D6, and 87, toward the opposing teeth, of the artificial teeth T1 to T7 and on the imaginary occlusal plane PL1. Specifically, the first positioning recess 12a is formed at a position adjacent to the recesses R1 in which the central incisors T1 are fitted on the central side of the array device 10. The second positioning recess 12b is formed at a position adjacent to the recess R7 in which the second molar T7 is fitted on the left side of the array device 10. The third positioning recess 12c is formed at a position adjacent to the recess R7 in which the second molar T7 is fitted on the right side of the array device 10.

At step ST4, the design device 70 detects the maximum convexity F1 of each of the artificial teeth T1 to T7, based on the design data of the artificial teeth T1 to T7. Based on the position of each maximum convexity F1, the design device 70 forms the wall 11a of the body 11 on the outside, opposite to the oral cavity, of the artificial teeth T1 to T7 and between the tips, toward the opposing teeth, of the artificial teeth T1 to T7 and the maximum convexities F1 corresponding thereto. Here, "tips toward the opposing teeth" are ends each lying at a position of the upper portion of crown closest to the opposing tooth. The "tips toward the opposing teeth" are e.g. an incisal edge, an apex, and a cusp apex.

The design data created at step ST4 is sent to the machining device 80.

At step ST5, the array device 10 is produced based on the design data of the array device 10. At step ST5, the machining device 80 produces the array device 10, based on the design data of the array device 10.

By carrying out steps ST1 to ST5 in this manner, the array device 10 can be manufactured.

Array Method

Figure 12:
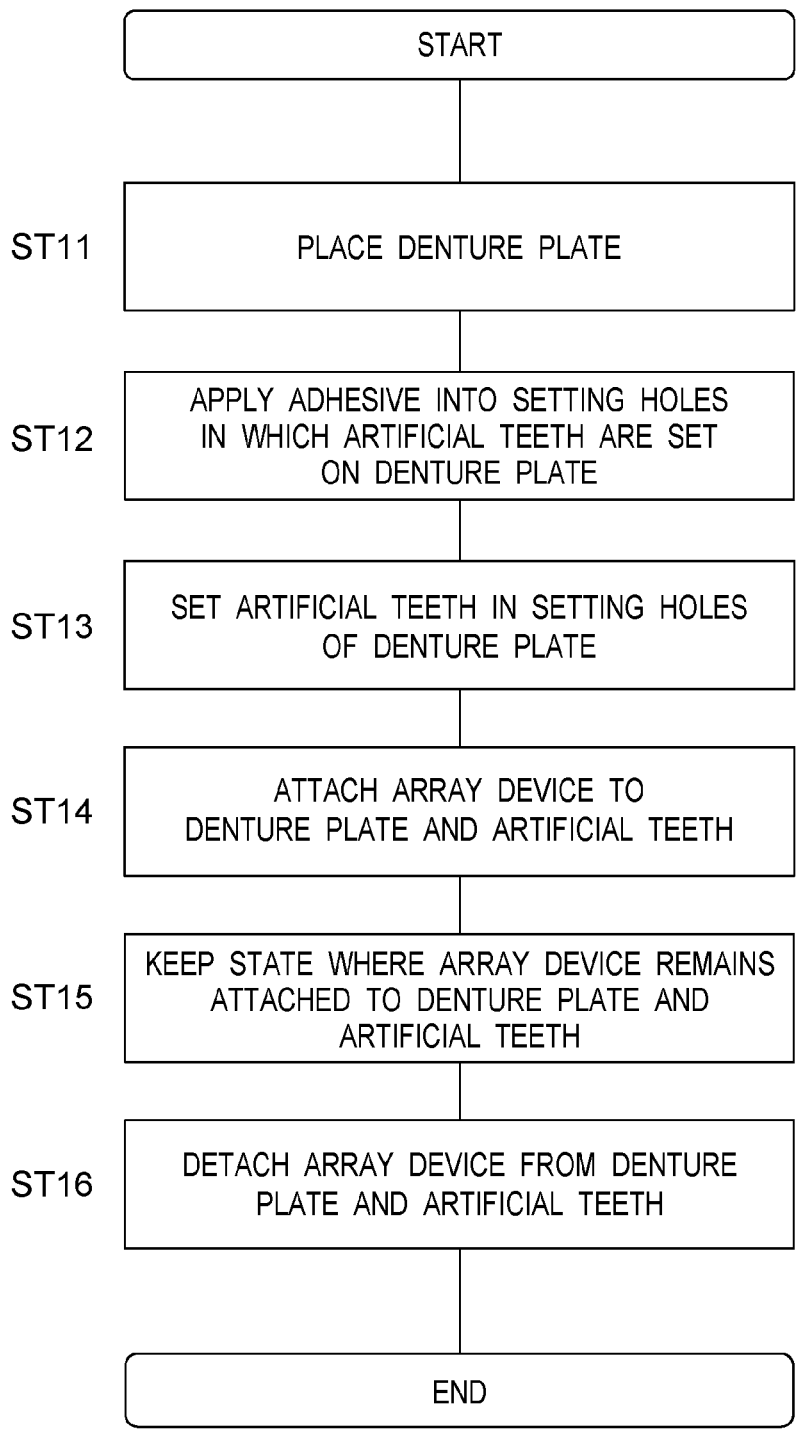
FIG. 12 is a flowchart showing an example of an array method of the first embodiment according to the present invention.

An array method using the array device 10 will be described. FIG. 12 is a flowchart showing an example of the array method of the first embodiment according to the present invention.

As shown in FIG. 12, the denture plate 20 is placed at step ST11. For example, the denture plate 20 is placed on a work table or an articulator.

At step ST12, the adhesive 20 is applied to the setting holes S1 to S7 in which the artificial teeth T1 to T7 are sec on the denture plate 20. For example, the adhesive 30 can be a self-curing resin (e.g. Provinice manufactured by Shofu Inc., Japan).

At step ST13, the artificial teeth T1 to T7 are set in the setting holes S1 to S7 of the denture plate 20.

At step ST14, the array device 10 is attached to the denture plate 20 and the artificial teeth T1 to T7. At step ST14, by bringing the inner walls of the positioning recesses 12a to 12c into contact with the outer walls of the positioning protrusions 21a to 21c, the position in the height direction is defined of the artificial teeth T1 to T7 arranged on the denture plate 20.

Specifically, by bringing the inner wall of the first positioning recess 12a into contact with the outer surface of the first positioning protrusion 21a, the artificial teeth T1 to T3 for front teeth are positioned on the imaginary occlusal plane PL1. By bringing the inner walls of the second positioning recess 12b and of the third positioning recess 12c into contact with the outer surfaces of the second positioning protrusion 21b and of the third positioning protrusion 21c, the artificial teeth T4 to T7 for premolars and molars are positioned at a predetermined distance from the imaginary occlusal plane PL1.

At step ST14, to cause the inner walls of the positioning recesses 12a to 12c to come into contact with the outer walls of the positioning protrusions 21a to 21c, the array device 10 may be pressed against the denture plate 20 and the artificial teeth T1 to T7. This enables the excess adhesive 30 to be extruded from the setting holes S1 to S7.

At step ST15, the state is kept where the array device 10 remains attached to the denture plate 20 and the artificial teeth T1 to T7. At step ST15, the state is kept for a predetermined period of time where the array device 10 remains attached to the denture plate 20 and the artificial teeth T1 to T7. The predetermined period of time is determined based on the curing time of the adhesive 30.

At step ST15, the array device 10 may remain pressed toward the denture plate 20 and the artificial teeth T1 to T7. By keeping the pressed state in this manner, the artificial teeth T1 to T7 can be restrained from rising.

At step ST15, the array device 10 is detached from the denture plate 20 and the artificial teeth T1 to T7. After detaching, the positioning protrusions 21a to 21c are removed from the denture plate 20. Thus, dentures are completed.

By carrying out the steps ST11 to ST15 in this manner, the artificial teeth T1 to T7 can be arrayed on the denture plate 20 using the array device 10.

Effects

According to the array device, the array method, and the manufacturing method of the first embodiment of the present invention, the following effects can be achieved.

The array device 10 is attached to the denture plate 20 and the artificial teeth T1 to T7 to thereby array the artificial teeth T1 to T7 on the denture plate 20. The array device 10 comprises the body 11 having one or more recesses R1 to R7 recessed in conformity with the crown shapes of the artificial teeth T1 to T7. The body 11 includes positioning portions 12a to 12c for positioning the artificial teeth T1 to T7 on the denture plate 20.

Such a configuration enables the artificial teeth T1 to T7 to be positioned on the denture plate 20. Specifically, the artificial teeth T1 to T7 can be arrayed on the denture plate 20 in an ideal state. For example, the aesthetics and masticatory function can be achieved as designed. Since the artificial teeth T1 to T7 can easily be arrayed on the denture plate 20, the work efficiency can be improved.

The denture plate 20 includes the positioning protrusions 21a to 21c. The positioning portions 12a to 12c of the body 11 are the positioning recesses 12a to 12c into which the positioning protrusions 21a to 21c are fitted. Due to the contact of the inner walls of the positioning recesses 12a to 12c with the outer walls of the positioning protrusions 21a to 21c, the position in the height direction is defined of the artificial teeth T1 to T7 arranged on the denture plate 20.

Such a configuration enables the artificial teeth T1 to T7 to be positioned on the denture plate 20 with high accuracy. Due to the definition of the position in the height direction of the artificial teeth T1 to T7 arranged on the denture plate 20, the ideal array state can more easily be achieved, resulting in an improvement in the aesthetics and masticatory function of the dentures. The work efficiency can further be improved.

The positioning portions 12a to 12c position, onto imaginary occlusal plane PL1, the incisal edges and apex of the central incisor T1, the lateral incisor T2, and the canine T3 of the artificial teeth T1 to T7.

Such a configuration can improve the aesthetics of the dentures.

The depth L1 of the recesses R1 to R7 is smaller than the height H1 of the artificial teeth T1 to T7 set in the recesses R1 to R7.

Such a configuration allows the denture plate 20 and a part of the artificial teeth T1 to T7 to be exposed from the array device 10. The denture plate 20 and the artificial teeth T1 to T7 are adhered together by the adhesive 30. Specifically, the adhesive 30 is applied to the setting holes S1 to S7 in which the artificial teeth T1 to T7 are set on the denture plate 20. When the array device 10 is attached to the denture plate 20 and the artificial teeth T1 to T7, the excess adhesive 30 from the setting holes S1 to S7 of the denture plate 20 flows out of the portions exposed from the array device 10. By allowing the denture plate 20 and a part of the artificial teeth T1 to T7 to be exposed from the array device 10 in this manner, the escape route for the excess adhesive 30 can be created.

The body 11 includes the wall 11a disposed on the outside, opposite to the oral cavity, of the artificial teeth T1 to T7. When the array device 10 is attached to the denture plate 20 and the artificial teeth T1 to T7, the wall 11a is disposed between the tips (the incisal edges, the apexes, and the cusp apexes), toward the opposing teeth, of the artificial teeth T1 to T7 and the maximum convexities outside the oral cavity.

Such a configuration can create the escape route for the excess adhesive 30 while improving the positioning accuracy of the artificial teeth T1 to T7 on the denture plate 20.

The body 11 is formed into a U shape. The positioning portions 12a to 12c include the first positioning recess 12a, the second positioning recess 12b, and the third positioning recess 12c. The first positioning recess 12a adjoins, inside of the body 11, the central recesses R1 in which the central incisors T1 of the artificial teeth T1 to T7 are set. The second positioning recess 12b adjoins, at the one end E1 of the body 11, the recess R7 toward the one end S1 in which the second molar T7 of the artificial teeth T1 to T7 is set. The third positioning recess 12c adjoins, at the other end E2 of the body 11, the recess R7 toward the other end E2 in which the second molar T7 of the artificial teeth T1 to T7 is set.

Such a configuration achieves, with high accuracy, the positioning of the artificial teeth for front teeth influencing the aesthetics of the dentures and the positioning of the artificial teeth for premolars and molars influencing the masticatory function. This enables the artificial teeth T1 to T7 to be arrayed on the denture plate 20 in the ideal array state for improving the aesthetics of the dentures and for improving the masticatory function.

The array method arrays the artificial teeth T1 to T7 on the denture plate 20. The array method includes a placement step ST11, an application step ST12, a setting step ST13, an attachment step ST14, a keep step ST15, and a detachment step ST16. The placement step ST11 places the denture plate. The application step ST12 applies the adhesive 30 to the setting holes S1 to S7 in which the artificial teeth T1 to T7 are set on the denture plate 20. The attachment step ST14 attaches the array device 10 to the denture plate 20 and the artificial teeth T1 to T7. The keep step ST15 keeps the state where the array device 10 remains attached to the denture plate 20 and the artificial teeth T1 to T7. The detachment step ST16 detaches the array device 10 from the denture plate 20 and the artificial teeth T1 to T7.

Such a configuration enables the artificial teeth T1 to T7 to be positioned on the denture plate 20. Specifically, the artificial teeth T1 to T7 can be arrayed on the denture plate 20 in the ideal state. For example, the aesthetics and masticatory function can be achieved as designed. Since the artificial teeth T1 to T7 can easily be arrayed on the denture plate 20, the work efficiency can be improved.

In the array method, the denture plate 20 includes the positioning protrusions 21a to 21c. The positioning portions 12a to 12c of the body 11 are the positioning recesses 12a to 12c. The attachment, step ST14 includes bringing the inner walls of the positioning recesses 12a to 12c into contact with the outer walls of the positioning protrusions 21a to 21c, to thereby define the position in the height direction of the artificial teeth T1 to T7 arranged on the denture plate 20.

Such, a configuration enables the artificial teeth T1 to T7 to be positioned on the denture plate 20 with high accuracy. Due to the definition of the position in the height direction or the artificial teeth T1 to T7 arranged on the denture plate 20, the ideal array state can more easily be achieved, resulting in an improvement in the aesthetics and masticatory function of the dentures. The work efficiency can further be improved.

The attachment step ST14 includes positioning, by the positioning portions 12a to 12c of the body 11, the incisal edges and apex of the central incisor T1, the lateral incisor T2, and the canine T3 of the artificial teeth T1 to T7 onto the imaginary occlusal plane PL1.

Such a configuration can improve the aesthetics of the dentures.

The keep step includes pressing the array device 10 toward the denture plate 20 and the artificial teeth T1 to T7.

Such a configuration makes it possible to restrain the artificial teeth T1 to T7 from rising and position the artificial teeth T1 to T7 on the denture plate 20. The artificial teeth T1 to T7 can more easily be arrayed on the denture plate 20 in the ideal state.

The method of manufacturing the array device 10 includes an acquisition step ST1 and creation steps ST2, ST3, and ST4. The acquisition step ST1 includes acquiring scan data of the patient's intraoral shape. The creation step ST2 includes creating design data of the denture plate 20, based on the scan data. The creation step ST3 includes creating design data of the artificial teeth T1 to T7 arranged on the denture plate 20, based on the design data of the denture plate 20. The creation step ST4 includes creating design data of the array device 10, based on the design data of the denture plate 20 and on the design data of the artificial teeth T1 to T7.

Due to such a configuration, there can be manufactured the array device 10 capable of positioning the artificial teeth T1 to T7 on the denture plate 20. Specifically, there can be manufactured the array device 10 capable of arraying the artificial teeth T1 to T7 on the denture plate 20 in the ideal state.

The step ST4 creating design data of the array device 10 includes designing the dimensions L11 and L21 of the positioning portions 12a to 12c, based on the tips, toward the opposing teeth, of the artificial teeth T1 to T7 and on the imaginary occlusal plane PL1.

Due to such a configuration, it is possible to manufacture the array device 10 having further improved positioning accuracy of the artificial teeth T1 to T7.

The step ST4 creating design data of the array device 10 includes: forming the positioning protrusions 21a to 21c on design data of the denture plate 20; and forming, on the body 11, one or more positioning recesses 12a to 12c as the positioning portions into which the positioning protrusions 21a to 21c are fitted.

Such a configuration enables the manufacture of the array device 10 having further improved positioning accuracy of the artificial teeth T1 to T7.

The step ST4 creating design data of the array device 10 includes detecting the maximum convexities of the artificial teeth T1 to T7, based on the design data of the artificial teeth T1 to T7. The step ST4 creating design data of the array device ID includes forming, based on the position of the maximum convexities F1, the wall 11a of the body 11 on the outside, opposite to the oral cavity, of the artificial teeth T1 to T7 and between the tips, toward the opposing teeth, of the artificial teeth T1 to T7 and the maximum convexities F1 corresponding thereto.

Such a configuration enables the manufacture of the array device 10 capable of creating the escape route for the excess adhesive 30 when attached.

Although in the first embodiment, the example has been described where the array device 10 arrays the artificial teeth T1 to T7 of the maxillary dentition, the present invention is not limited thereto. The array device 10 may array artificial teeth of the mandibular dentition.

Although in the first embodiment, the example has been described where the array device 10 arrays the artificial teeth T1 to T7 on the denture plate 20, the present invention is not limited thereto. For example, the array device 10 may also array one or more artificial teeth.

Although in the first embodiment, the example has been described where the array device 10 includes the positioning portions 12a to 12c, the present invention is not limited thereto. For example, the array device 10 may also include one or more positioning portions.

Although in the first embodiment, the example has been described where the positioning portions 12a to 12c are the positioning recesses 12a to 12c, this is not limitative. For example, the positioning portions 12a to 12c may be positioning protrusions. In this case, the denture plate 20 may include positioning recesses, instead of the positioning protrusions 21a to 21c.

Although in the first embodiment, the example has been described where the body 11 of the array device 10 includes the recesses R1 to R7, this is not limitative. For example, the body 11 of the array device 10 may also include one or more recesses R1 to R7.

Although in the first embodiment, the example has been described where the denture plate 20 includes the setting holes S1 to S7, this is not limitative. For example, the denture plate 20 may also include one or more setting holes. The denture plate 20 is not limited to a complete denture plate. The denture plate 20 may be a partial denture plate.

Although in the first embodiment, the example has been described where the denture plate 20 includes the positioning protrusions 21a to 21c, this is not limitative. For example, the denture plate 20 may also include one or more positioning protrusions.

Although in the first embodiment, the example has been described where the first positioning portion 12a positions, onto the imaginary occlusal plane PL1, the incisal edge D1, the incisal edge, and the apex, respectively, of the central incisor T1, the lateral incisor T2, and the canine T3 that are artificial teeth for front teeth, this is not limitative. For example, the first positioning portion 12a may also position at least the incisal edge D1 of the central incisor T1 onto the imaginary occlusal plane PL1.

Although in the first embodiment, the second positioning portion 12b and the third positioning portion 12c position, at a predetermined distance from the imaginary occlusal plane PL1, the cusp apexes of the first premolar T4, the second premolar T5, the first molar T6, and the second molar T7 that are artificial teeth for premolars and molars, this is not limitative. For example, the second positioning portion 12b and the third positioning portion 12c may also position at least the cusp apex D7 of the second molar T7 at a predetermined distance from the imaginary occlusal plane PL1.

Although in the first embodiment, the example has been described where the method of manufacturing the array device 10 includes steps ST1 to ST5, the present invention is not limited thereto. In the manufacturing method, steps ST1 to ST5 may be reduced, divided, and integrated. Alternatively, the manufacturing method may include an additional step.

Although in the first embodiment, the example has been described where the manufacturing method is carried out by the manufacturing system, the present invention is not limited thereto. Any manufacturing method is acceptable as long as it is executed by a computer.

Although in the first embodiment, the example has been described where the array method includes steps ST11 to ST16, the present invention is not limited thereto. In the manufacturing method, steps ST11 to ST16 may be reduced, divided, and integrated. Alternatively, the array method may include an additional step.

In the array method, the artificial teeth for front teeth and the artificial teeth for premolars and molars may separately be arrayed. For example, by carrying out steps ST12 to St16 a plurality of times, the artificial teeth for front, teeth and the artificial teeth for premolars and molars may be arrayed in order. For example, the array method may include arraying the artificial teeth T1 to 77 in three, different stages. In this case, in the first array stage, there may be arrayed the first premolar T4, the second premolar T5, the first molar T6, and the second molar T7 on the left side of the denture plate 20. In the second array stage, there may be arrayed the central incisors T1, the lateral incisors T2, and the canines T3 on both the left and right sides of the denture plate 20. In the third array stage, there may be arrayed the first premolar T4, the second premolar T5, the first molar T6, and the second molar T7 on the right side of the denture plate 20.

Although in the first embodiment, the array device 10, the array method, and the manufacturing method have been described by way of example, the present invention is applicable also to a program and to a computer-readable storage medium. For example, the program may cause the computer to execute the manufacturing method described above. The computer-readable storage medium may store the program for causing the computer to execute the manufacturing method described above.

SECOND EMBODIMENT

A array device, an array method, and a manufacturing method according to a second embodiment of the present invention will be described. In the second embodiment, the difference from the first embodiment will chiefly be described. In the second embodiment, the same or equivalent constituent elements as or to those of the first embodiment will be described with the same reference numerals. In the second embodiment, descriptions overlapping with the first, embodiment will be omitted.

Figure 13:
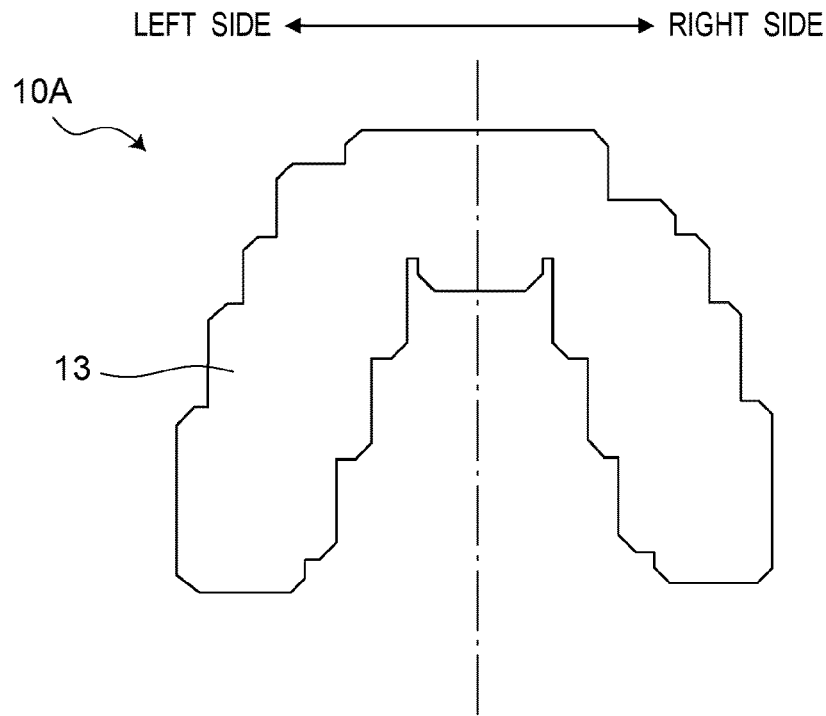
FIG. 13 is a plan view showing an example of an array device of a second embodiment according to the present invention.
Figure 14:
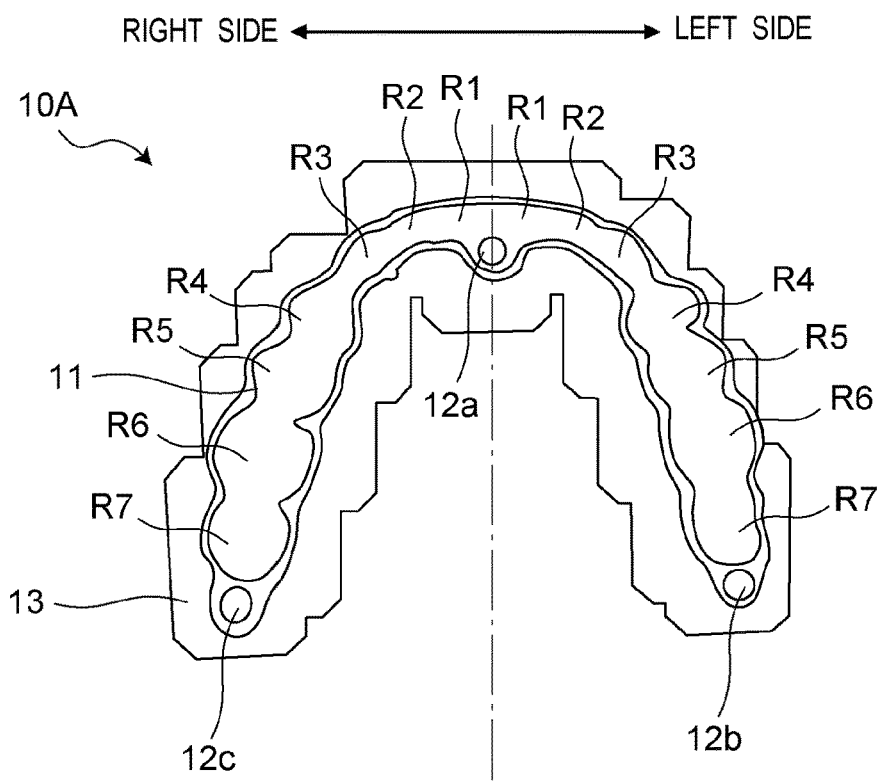
FIG. 14 is a bottom view of the array device of FIG. 13.

An example of the array device of the second embodiment will be described with reference to FIGS. 13 and 14. FIG. 13 is a plan view showing an example of an array device 10A of the second embodiment according to the present invention. FIG. 14 is a bottom view of the array device 10A of FIG. 13.

The second embodiment differs from the first embodiment in comprising a pressing portion 13. In the array device 10A, the other constituent elements are similar to chose of the array device 10 of the first embodiment.

As shown in FIGS. 13 and 14, the array device 10A further comprises the pressing portion 13.

The pressing portion 13 is disposed on the side of the body 11 opposite to the side on which the recesses R1 to R7 are disposed. The pressing portion 13 has a flat surface. The pressing portion 13 is formed into e.g. a plate shape. The pressing portion 13 is formed over the entire upper surface of the body 11.

For example, the pressing portion 13 is produced by the machining device such as the 3-D printer or the grinding device. The pressing portion 13 may be formed integrally with the body 11 of the array device 10A. The pressing portion 13 may be formed separately from the body 11 and may be adhered to the body 11 with an adhesive, etc. Alternatively, the pressing portion 13 may be fitted in the body 11 for attachment.

In the array method of the second embodiment, step ST15 in which the state is kept where the array device 10A remains attached to the denture plate 20 and the artificial teeth T1 to T7, includes pressing the pressing portion 13 to thereby press the array device 10A toward the denture plate 20 and the artificial teeth T1 to T7.

In the method of manufacturing the array device 10A of the second embodiment, step ST4 in which design data of the array device 10A is created, includes designing the pressing portion 13 disposed on the side of the body 11 opposite to the side on which the recesses R1 to R7 are disposed.

Effects

According to the array device, array method, and manufacturing method of the second embodiment of the present invention, the following effects can be achieved.

The array device 10A comprises the pressing portion 13 disposed on the side of the body 11 opposite to the side on which the recesses R1 to R7 are disposed. Due to such a configuration, an even force can be applied to the array device 10A by pressing the pressing portion 13. This facilitates attachment of the array device 10A to the denture plate 20 and the artificial teeth T1 to T7. This also helps the pressing portion 13 press the array device 10A against the denture plate 20 and the artificial teeth T1 to T7.

In the array method, step ST15 in which the state is kept where the array device 10A remains attached to the denture plate 20 and the artificial teeth T1 to T7, includes pressing the pressing portion 13 to thereby press the array device 10A toward the denture plate 20 and the artificial teeth T1 to T7. This makes it possible to keep the state where the array device 10A remains pressed against the denture plate 20 and the artificial teeth T1 to T7. As a result, it is possible to fix the artificial teeth T1 to T7 to the denture plate 20 to keep the array state until the adhesive 30 cures.

In the method of manufacturing the array device 10A, step ST4 in which design data of the array device 10A is created, includes designing the pressing portion 13 disposed on the side of the body 11 opposite to the side on which the recesses R1 to R7 are disposed. Such a configuration enables the production of the array device 10A having the pressing portion 13 that makes it easy to press the array device 10A against the denture plate 20 and the artificial teeth T1 to T7.

Although in the second embodiment, the example has been described where the pressing portion 13 is formed over the entire upper surface of the body 11, the present invention is not limited thereto. The pressing portion 13 may also be formed on at least a part of the upper surface of the body 11. The array device 10A may comprise one or more pressing portions 13.

EXAMPLES

Examples 1-2 and Comparative Examples 1-2 will be described. The present invention is net limited by Examples 1-2 shown below.

In Example 1, maxillary dentures were produced using the array device 10 of the first embodiment of the present invention. In Example 2, mandibular dentures were produced using the array device 10 of the first embodiment of the present invention. In Examples 1-2, the denture plate 20 was modeled with a 3-D printer, and ready-made artificial teeth (Veracia SA manufactured by Shofu Inc., Japan) were used as the artificial teeth. Provinice manufactured by Shofu Inc.

Figure 15:
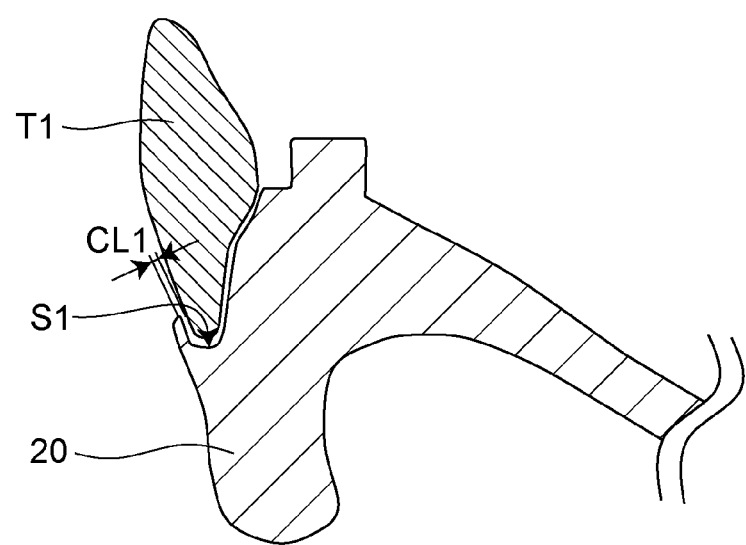
FIG. 15 is a view showing a clearance between the denture plate and an artificial tooth.

In Examples 1-2, when creating denture design data, a clearance was disposed between the denture plate 20 and the artificial teeth. FIG. 15 is a view showing a clearance CL1 between the denture plate 20 and the upper central incisor T1. As shown in FIG. 15, the clearance CL1 was provided between the denture plate 20 and the upper central incisor T1 to secure the thickness for the adhesive 20 to be applied. The clearance CL1 was 0.1 mm. The clearance CL1 was disposed between the denture plate 20 and all the artificial teeth.

In Examples 1-2, the artificial teeth were arrayed in three different stages using the array device 10. Specifically, arrayed in the first array stage were the first premolar, the second premolar, the first molar, and the second molar on the left side of the denture plate 20. Arrayed in the second array stage were the central incisors, lateral incisors, and the canines on both the left and right sides of the denture plate 20. Arrayed in the third array stage were the first premolar, the second premolar, the first molar, and the second molar on the right side of the denture plate 20.

In Comparative Example 1, a dental technician produced maxillary dentures by freehand. In Comparative Example 2, the dental technician produced mandibular dentures by freehand. In Comparative Examples 1-2, the dental technician arrayed artificial teeth one by one onto the denture plate 20 without using the array device 10. In Comparative Examples 1-2, the ocher conditions were the same as in Examples 1-2.

In Examples 1-2 and Comparative Examples 1-2, the surface deviation of the produced dentures with respect to the design data was measured. GOM Inspect 2018 manufactured by COM Inc. was used as inspect software for the surface deviation.

Figure 16:
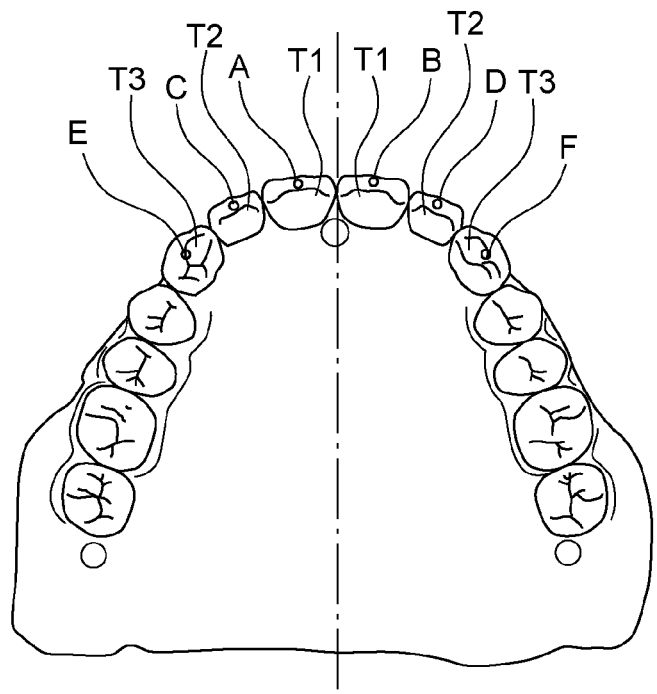
FIG. 16 is a view showing measurement points of maxillary dentures in Example 1 and Comparative Example 1.
Figure 17:
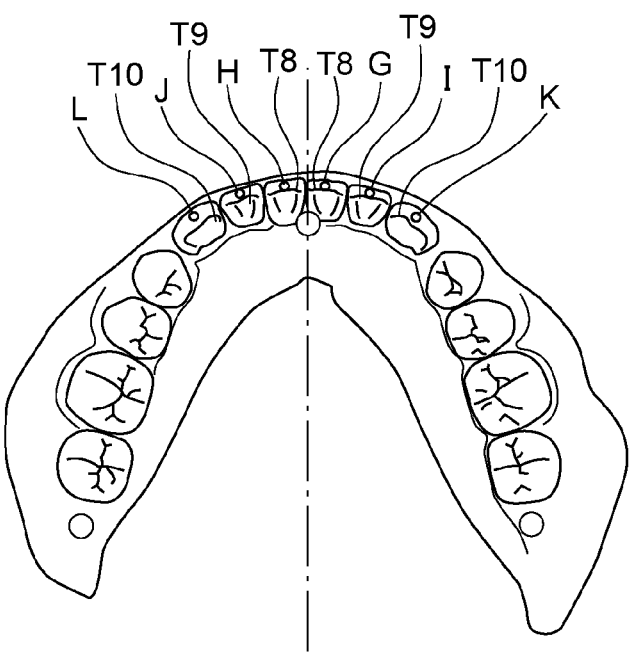
FIG. 17 is a view shaving measurement points of mandibular dentures in Example 2 and Comparative Example 2.

FIG. 16 is a view showing measurement points of the maxillary dentures in Example 1 and Comparative Example 1, FIG. 17 is a view showing measurement points of the mandibular dentures in Example 2 and Comparative Example 2. In Example 1 and Comparative Example 1, as shown in FIGS. 16, the surface deviation was measured: at a central portion on the incisal edge of the upper central incisor T1; at a central portion on the incisal edge of the upper lateral incisor T2; and at an apex of the upper canine T3. In Example 2 and Comparative Example 2, as shown in FIG. 17, the surface deviation was measured: at a central portion on the incisal edge of the lower central incisor T8; at a central portion on the incisal edge of the lower lateral incisor T9; and at an apex of the lower canine T10.

FIG. 18 is a table showing an example of measurement, results in Example 1 and Comparative Example 1. FIG. 19 is a table showing an example of measurement results in Example 2 and Comparative Example 2. As shown in FIGS. 18 and 19, Examples 1-2 have smaller surface deviations, as compared with Comparative Examples 1-2. In this manner, Examples 1-2 make it possible to suppress the deviation from the design data.

FIG. 20 is a table showing an example of production times in Examples 1-2 and Comparative Examples 1-2. As shown in FIG. 20, the production times in Examples 1-2 are shorter than those in Comparative Examples 1-2. In this manner, Examples 1-2 make it possible to shorten the production times, achieving an improvement in the work efficiency.

Although the present invention has fully been described in relation to the preferred embodiments while referring to the accompanying drawings, it will be obvious for those skilled in the art that the present invention, can variously be modified or altered. Such modifications or alterations should be construed as being encompassed within the scope of the present invention defined by the appended claims without departing therefrom.

According to the array device and the array method of the present invention, artificial teeth can easily and efficiently be positioned on the denture plate. Accordingly, the present invention is useful for improvement in quality and achievement of uniformity of dental prosthetic devices in the dental field.

The invention claimed is:

1. An array system comprising:
    a denture plate having one or more positioning protrusions;
    one or more artificial teeth; and
    an array device configured to be attached to the denture plate and the one or more artificial teeth so as to array the one or more artificial teeth on the denture plate, the array device including a body having one or more recesses recessed in conformity with crown shapes of the one or more artificial teeth, respectively, wherein
    the body includes one or more positioning recesses into which the one or more positioning protrusions are respectively insertable, the one or more positioning recesses being configured to position the one or more artificial teeth on the denture plate, and
    wherein each of the one or more positioning recesses is concave and extends, in a height direction of the one or more artificial teeth, from an opening to a closed end surface that is opposite the opening relative to the height direction, and the closed end surface is configured to contact an uppermost surface of a respective one of the one or more positioning protrusions upon the respective insertion of the one or more positioning protrusions into the one or more positioning recesses so as to define a position, with respect to the height direction, of the one or more artificial teeth arranged on the denture plate.

2. The array system of claim 1, wherein
the one or more positioning recesses position an incisal edge of at least a central incisor of the one or more artificial teeth onto an imaginary occlusal plane.

3. The array system of claim 1, wherein
a depth of the one or more recesses is smaller than a height of the one or more artificial teeth arranged in the one or more recesses.

4. The array system of claim 3, wherein
the body includes a wall disposed on an outside, opposite to an oral cavity, of the one or more artificial teeth, and wherein
when the array device is attached to the denture plate and the one or more artificial teeth, the wall lies between a tip, toward an opposing tooth, of the one or more artificial teeth and a maximum convexity outside the oral cavity.

5. The array system of claim 1, wherein the one or more artificial teeth comprises a plurality of artificial teeth,
    wherein the one or more recesses comprises a plurality of recesses, the plurality of recesses including central recesses, a first end recess and a second end recess,
    wherein the body is formed into a U shape, and wherein the one or more positioning recesses include:
        a first positioning recess adjoining, inside of the body, the central recesses in which central incisors of the plurality of artificial teeth are set;
        a second positioning recess adjoining, at a first end of the body, the first end recess in which a second molar of the plurality of artificial teeth is set; and
        a third positioning recess adjoining, at a second end of the body, the second end recess in which another second molar of the plurality of artificial teeth is set.

6. The array system of claim 1, further comprising:
    a pressing plate disposed on a side of the body opposite to a side on which the one or more recesses are provided.

7. The array system of claim 3, wherein
the one or more positioning recesses position an incisal edge of at least a central incisor of the one or more artificial teeth onto an imaginary occlusal plane.

8. The array system of claim 2, wherein
a depth of the one or more recesses is smaller than a height of the one or more artificial teeth arranged in the one or more recesses.

* * * * *